United States Patent
Uchiyama et al.

(10) Patent No.: US 6,177,153 B1
(45) Date of Patent: Jan. 23, 2001

(54) ORIENTATED FILM HAVING PORES

(75) Inventors: Akihiko Uchiyama; Toshiaki Yatabe, both of Hino (JP)

(73) Assignee: Teijin Limited (JP)

(*) Notice: Under 35 U.S.C. 154(b), the term of this patent shall be extended for 0 days.

(21) Appl. No.: 09/043,997

(22) PCT Filed: Aug. 4, 1997

(86) PCT No.: PCT/JP98/02700

§ 371 Date: Apr. 2, 1998

§ 102(e) Date: Apr. 2, 1998

(87) PCT Pub. No.: WO98/05984

PCT Pub. Date: Feb. 12, 1998

(30) Foreign Application Priority Data

| Aug. 5, 1996 | (JP) | 8-220748 |
| Dec. 16, 1996 | (JP) | 8-352574 |

(51) Int. Cl.$^7$ ........................................ B32B 3/10
(52) U.S. Cl. ............... 428/1.1; 156/244.11; 156/244.24; 349/96; 349/104; 428/131; 428/138; 428/141; 428/142; 428/143; 428/148; 428/327; 428/416; 428/426; 428/457
(58) Field of Search .................. 428/1.1, 131, 138, 428/141, 143, 142, 148, 327, 412, 426, 457; 156/244.11, 24.24; 349/96, 104

(56) References Cited

U.S. PATENT DOCUMENTS

| 4,929,523 | 5/1990 | Kitayama et al. ............. 430/4 |
| 5,108,857 | 4/1992 | Kitayama et al. ............. 430/4 |
| 5,710,856 | 1/1998 | Ishii et al. .................. 385/146 |

FOREIGN PATENT DOCUMENTS

| 496 323 A2 | 7/1992 | (EP) . |
| 0 503 071 | 9/1992 | (EP) . |
| 627 638 | 12/1994 | (EP) . |
| 697281 | * 2/1996 | (EP) . |
| 59-081625 | 5/1984 | (JP) . |
| 62-065957 | 3/1987 | (JP) . |
| 758361 | 12/1988 | (JP) . |
| 1040902 | 2/1989 | (JP) . |
| 1077001 | 3/1989 | (JP) . |
| 6298957 | 10/1994 | (JP) . |
| 7104127 | 4/1995 | (JP) . |
| 7104272 | 4/1995 | (JP) . |
| 7209637 | 8/1995 | (JP) . |
| 8076112 | 3/1996 | (JP) . |
| 8087009 | 4/1996 | (JP) . |
| 8160206 | 6/1996 | (JP) . |
| 8262208 | 10/1996 | (JP) . |
| 9127501 | 5/1997 | (JP) . |
| 9166702 | 6/1997 | (JP) . |
| WO 96/21168 | 7/1996 | (WO) . |

* cited by examiner

*Primary Examiner*—Nasser Ahmad
(74) *Attorney, Agent, or Firm*—Rader, Fishman & Grauer

(57) ABSTRACT

A film of the present invention is an oriented film having a light-scattering property varying with an incident angle and is useful e.g. as a viewing angle improvement film effective for improving the picture quality of a liquid crystal display device, especially for expanding the viewing angle. This oriented film is composed of a thermoplastic polymer and contains a number of micro voids participating in the above scattering property in the film. It can be produced by uniaxially drawing a film composed of a thermoplastic polymer under temperature and draw-ratio conditions to form grooves on the surface of the film perpendicular to the drawing direction.

30 Claims, 20 Drawing Sheets

ORIENTATED FILM HAVING PORES

TECHNICAL FIELD

This invention relates to a film having light-scattering property varying with angle. More particularly, this invention relates to an oriented film containing micro voids, varying its light-scattering property dependent upon angle and useful as a viewing angle control plate taking advantage of the characteristics to vary the light-scattering property with an incident angle, and a viewing angle improvement film capable of improving the picture quality, especially the viewing angle in the case of using in a liquid crystal display device.

BACKGROUND ART

A sheet-formed article made of general transparent plastic or *a glass exhibits high transparency to light entering at any incident angle and is used as windows and various other optical materials. The sheet can be imparted with a function to scatter the light applied to the sheet by forming irregularity on the surface of the above transparent glass or uniformly dispersing fine particles of several microns order in a plastic sheet, and these sheets are being used also as a light-scattering plate. It is known that the viewing angle of a liquid crystal display device can be improved to attain a wide viewing angle by placing the light scattering plate in front of a polarizing plate placed in front of a liquid crystal display device.

However, these light-scattering plates randomly scatter an incident light entered from any direction and are free from function to selectively scatter an incident light entered at a specific incident angle.

On the other hand, a transparent formed article having a light transmittance dependent upon an incident angle to vary the light-scattering property varying with angle can be utilized e.g. as a viewing angle control plate which can be seen from an angle and is difficult to see from another direction.

A diffraction-type optical element having light diffraction effect and produced by forming a grate-like unevenness on the surface of a transparent substrate made of glass, plastic, etc., is already known as an optical element having the above characteristics. However, the production of such optical element necessitates a highly elaborate manufacturing process, etc., and, although it is effective in certain particular uses, it has a problem of low productivity and high cost in a use necessitating an optical element having a large area.

The specification of the Japanese Patent TOKKAISHO 62-65957 describes a photochromic glass which is highly transparent when seen from the side of an observer and shields the light entering from a direction other than the observer. The photochromic glass can be produced by forming a fine steric pattern formed by curing a photosensitive resin and placing the pattern between a pair of glass plates, and a highly elaborate manufacturing process is necessary for forming the steric pattern. Furthermore, the manufacturing process comprises a number of troublesome steps and the glass is colored by the irradiation of light.

Light-control plates scattering only the light of a specific incidence angle are described in the specifications of the Japanese Patent TOKKOHEI 7-58361, TOKKAISHO 64-40902 and TOKKAISHO 64-77001. The light-control plate has a multilayer structure composed of a photo-setting resin having two microscopic regions arranged parallelly and periodically in a definite direction, and is produced by using two or more kinds of polymerizable monomers and/or oligomers giving cured resins having different refractive indices. It is necessary in the above case to optimize the polymerizability, refractive index difference, etc., of these monomers, etc. Since the photo-set layer has poor resistance to external stress, the layer is supposed to be used mainly in a structure sandwiched between a pair of plastic films, etc., or laminated on a transparent substrate such as a glass plate. There is a problem in productivity of the plate owing to the troublesome manufacturing process of the plate necessitating many steps.

The specification of the Japanese Patent TOKKAIHEI 9-166702 (Laid-open date: Jun. 24, 1997) discloses a process for the production of a light-control film having a light transmittance dependent on an incident angle by immersing a polymer film in a non-solvent of the polymer and/or a solution including a surfactant and winding on a roll. This production process is complicate because it necessitates the immersion of a film in a solvent, etc., the bending of the immersed film with a roll to generate cracks (called as crazes in the specification) on the surface of the film and the removal of the solvent, etc., from the film. The crazes are generated exclusively on the surface of the film degenerated by the solvent, etc., and, accordingly, the optical properties of the film are determined by the surface morphology of the film. However, the control of the surface morphology seems to be difficult because a solvent, etc., is used in the production. Furthermore, it is difficult to narrow the pitch of crazes and, accordingly, the production of e.g. a film having high haze by front view and low haze by oblique views is supposed to be difficult. Other possible problems are the liability of the curling of the film and the considerable change in the optical properties in the case of the application of the hard-coating treatment, etc., to the crazed surface owing to the surface properties determining the optical properties.

DISCLOSURE OF THE INVENTION

The object of the present invention is to provide a new film having light-scattering property varying with an incident angle.

Another object of the present invention is to provide a new light-scattering film transmitting the light entering from a specific direction and scattering the light entering from the other directions.

A further object of the present invention is to provide a liquid crystal display device, a viewing angle improvement film and a view angle control plate as the applications of the above film of the present invention.

Still another object of the present invention is to provide a process for producing a film having the scattering property of transmitted light varying with an incident angle on high productivity and industrial scale at a low cost.

Still further object and the advantage of the present invention will be clarified by the following descriptions.

The inventors of the present invention have found that a drawing of a thermoplastic polymer film in a manner to form surface grooves perpendicular to a drawing direction generates a number of micro voids nearly periodically in the drawing direction in the film having polymer chains oriented by drawing and that the oriented film produced by this process has light-scattering property varying with an incident angle. The inventors have also found that the variation of the scattering property of the transmitted light with an incident angle can be adjusted by a proper selection of the drawing conditions to enable the control of the angle causing the maximum transmitted light intensity. The present invention has been attained based on the above findings.

According to the present invention, the above objects and advantages of the invention can be achieved by a void-containing oriented film made of a thermoplastic polymer, containing a number of micro voids in the film and varying a scattering property of the transmitted light dependent upon an incident angle.

The above oriented film containing voids can be produced by an uniaxial drawing of a film made of a thermoplastic polymer in such a manner as to form grooves on the surface of the film in the direction perpendicular to the drawing direction of the film.

BEST MODE FOR CARRYING OUT THE INVENTION

The void-containing oriented film of the present invention has a total light transmittance of 60% or over measured by the light entering from the normal line direction and the transmittance depends upon an incident angle because a haze of the film varies with the incident direction of light. The objective film preferably has a light transmittance satisfying the following conditions when the measurement is carried out by using an optical system shown by the FIG. 4. The total light transmittance is preferably 80% or over, more preferably 87% or over in the case of using the oriented film of the present invention mainly as a light-transmitting member or as a viewing angle improvement film for a liquid crystal display device. The total light transmittance mentioned above is defined by JIS K7105 and measured by projecting the standard light A defined by the International Commission on Illumination (CIE) perpendicularly to a film and detecting all light scattering to the front side of the film as a transmitted light.

Figure 4:
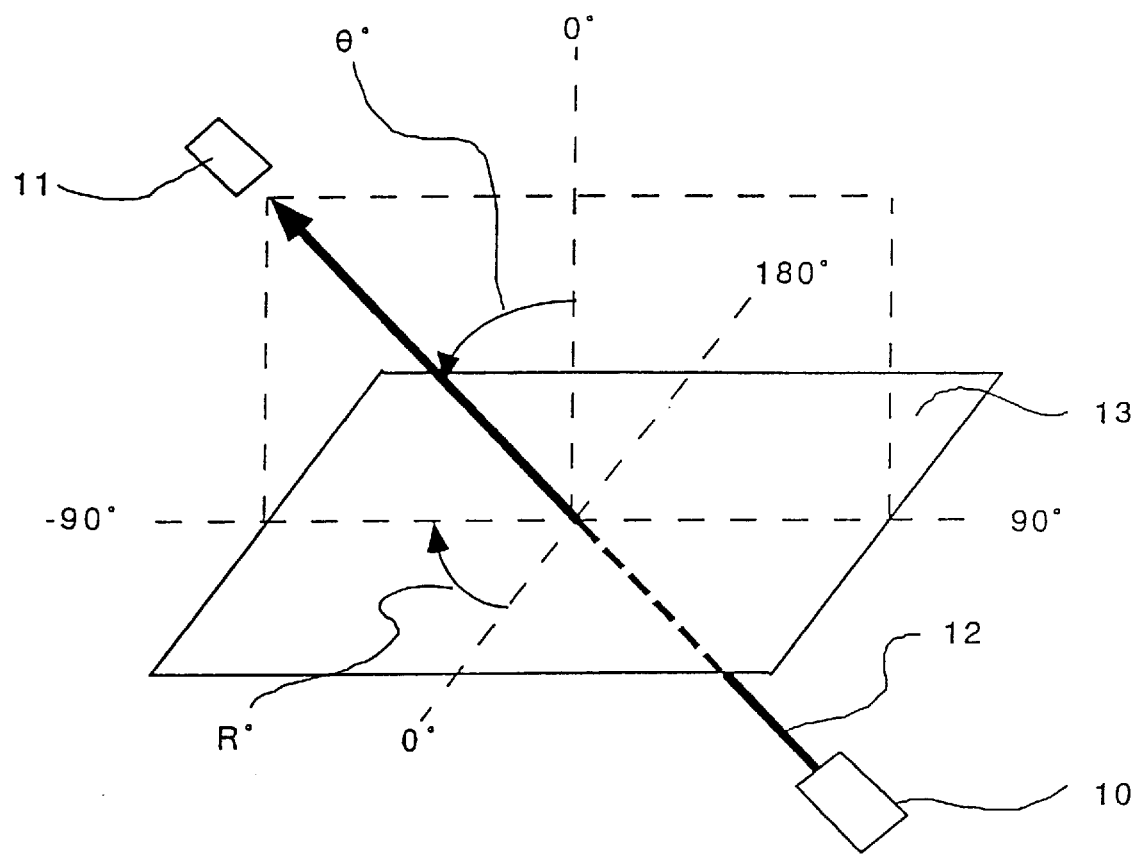
FIG. 4 is a schematic drawing of an optical system for the determination of an incident angle dependence of the parallel raytransmittance.

In the FIG. 4, the sign 10 is a light source for projecting a parallel ray, 11 is a detector, 12 is an incident light and 13 is a specimen film. The incident direction of light (projecting direction) is defined by the angle θ (°) between the incident light and the normal line of the film surface and a rotational angle R(°) on the film surface around the normal line. The oriented film of the present invention has a rotational angle R satisfying the following formulas in the range of 0°≦θ≦60° and −180°<R≦−180°:

$$\text{Tmax}/\text{Tmin} > 1.5 \text{ when } \theta \text{ min} < \theta \text{ max} \tag{I}$$

$$\{\text{Tmax} \times \cos(\theta \text{ min})\}/\{\text{Tmin} \times \cos(\theta \text{ max})\} > 1.5 \text{ when } \theta \text{ min} > \theta \text{ max} \tag{II}$$

wherein Tmin (%) is the minimum parallel ray transmittance, θ min (°) is an incident angle corresponding to the above, Tmax (%) is the maximum parallel ray transmittance and θ max (°) is an incident angle corresponding to the above.

The position of the rotational angle R=0° as a standard position can be arbitrarily set by the optical instrument for the measurement. The conditions should be satisfied at the same R value. The incident light is parallel light. In the present invention, it was defined by the evaluation apparatus for liquid crystal display device manufactured by Otsuka Electronics Co., (product name: LCD5100) using a halogen lamp as the light source and provided with an optical system having a Y luminous efficiency filter for getting the Y value defined by JIS Z8701 and placed in front of a photomultiplier detector.

The term of "the variation of haze with incident angle" used in the present invention is not the phenomenon caused by the variation of the optical path length of the light transmitting through the film by the variation of an incident angle but the phenomenon caused by the structure in the film. The optical path length is corrected in the case of $\theta$ min>$\theta$ max in the above conditions to discriminate the film from a scattering material or an absorbing material which simply increases its haze or absorptivity by the increase in the optical path length.

The oriented film of the present invention is suitable especially as a viewing angle improvement film for a liquid crystal display device. In the case of using the oriented film of the present invention as a viewing angle control plate for a building material, etc., the film preferably satisfies the following formulas $$Tmax/Tmin > 2 \text{ when } \theta \min < \theta \max \quad (I')$$

$$\{Tmax \times \cos(\theta \min)\}/\{Tmin \times \cos(\theta \max)\} > 2 \text{ when } \theta \min > \theta \max \quad (II')$$

Naturally, the oriented film satisfying the conditions may be used in a liquid crystal display device.

The oriented film of the present invention satisfies the above formulas (I) and (II) in a plane perpendicular to the surface of the oriented film and parallel to the direction of orientation when the position of R=0° is taken as the orientation (drawing) direction of the film.

The spectral transmittance of the oriented film of the present invention at wavelength of 400 to 1,500 nm may have certain peaks and valleys, however, it essencially monotonously increases, keeps a constant value or decreases. Accordingly, there is essentially no wavelength dispersion of the spectral transmittance causing chromatic colour, etc., which is a problem inherent e.g. in a hologram formed by using a photopolymer. Since the thermoplastic polymer constituting the oriented film has high transparency, the film is an achromatic colour one and gives essentially colorless transmitted light and scattered light.

For example, the parallel ray transmittance of the void-containing oriented film of the present invention was measured in the Example 1. The spectral transmittance values at the measuring wavelength of 500 nm and 1,500 nm were 30.3% and 78.2%, respectively, and the T1500/T500 ratio was 2.58.

The oriented film of the present invention preferably satisfies the following formulas $$0.5 \leq T1500/T500 \leq 30 \quad (III)$$

and $$3\% \leq T500(\%) \leq 85\% \quad (IV),$$

more preferably $$0.9 \leq T1500/T500 \leq 10$$

and $$5\% \leq T500(\%) \leq 83\%$$

wherein T500(%) and T1500(%) are parallel ray transmittance values of the film measured at wavelengths of 500 nm and 1,500 nm, respectively. It is known that the parallel ray transmittance of a light-scattering film depends upon the wavelength and the dependence reflects the refractive index distribution in the film. For example, the wavelength dispersion of a parallel ray transmittance is dependent upon the average diameter of fine particles in the case of a film consisting of a polymer film and spherical fine particles dispersed in the polymer and having a refractive index different from that of the polymer. The values of T1500/T500 and T500 defined above are supposed to contain the information on the size, distribution state, density, etc., of the voids in the film, however, it is difficult to separate the contribution of each item. Anyhow, the oriented film of the present invention satisfying the above conditions has excellent characteristics to exhibit light-scattering specific to an incident angle.

Especially when T1500/T500 is larger than 30, the back scattering becomes large and when T500(%) is smaller than 3%, the transparency is lowered and the back scattering becomes also large. A film of T500(%)$\geq$=85% sometimes causes the variation of the objective light-scattering property with angle to cause the difficulty in controlling the transmitted light.

In the case of using the oriented film of the present invention as a viewing angle increasing film of a liquid crystal display device, the film preferably satisfies the formulas $$0.9 \leq T1500/T500 \leq 8$$

and $$5\% \leq T500(\%) \leq 80\%,$$

more preferably $$0.9 \leq T1500/T500 \leq 7$$

and $$7\% \leq T500(\%) \leq 80\%$$

to further suppress the back scattering and enable the control of the transmitted light.

The values of T1500 and T500 used in the present specification are obtained by measuring the transmittance of parallel double-beams with a spectrophotometer manufactured by Hitachi Ltd. (product name. U-3500). These values are defined by the values obtained by projecting the light in the direction of the normal line of the film surface.

The micro void-containing oriented film of the present invention is essentially composed of a thermoplastic polymer having high transparency taking advantage of excellent moldability of the polymer.

The thermoplastic polymer to be used in the present invention has a glass transition temperature of preferably 50 to 300° C., more preferably 80 to 250° C. A polymer having a glass transition temperature lower than 50° C. may give a formed film having poor heat-resistance and the transition temperature exceeding 300° C. sometimes causes insufficient moldability.

Examples of such thermoplastic polymer are polycarbonate, polyarylate, polymethacrylate, polyacrylonitrile, polymethyl methacrylate, polyacrylate, polyethylene terephthalate, polyethylene naphthalate, polyethylene, polypropylene, polystyrene, polyvinyl chloride, polyvinyl alcohol, polyether sulfone, polysulfone, polyimide, polyamide, polyether ketone, polyolefin, triacetyl cellulose, and aromatic polymer liquid crystal. Such thermoplastic polymer may be used in the form of a copolymer or a blend of two or more kinds of the polymers.

The thermoplastic polymer is preferably an amorphous polymer such as polycarbonate, polyarylate, polyolefin, polysulfone, polyether sulfone or their copolymer. The amorphous polymer is the one which does not take a crystalline phase or a liquid crystal phase by ordinary drawing condition. Such polymer is preferable because it does not cause the phase change after or during the uniaxial drawing to facilitate the control of the optical characteristics. Among the above polymers, polycarbonate is especially preferable from the viewpoints of the availability of inexpensive raw materials, heat-resistance, transparency, moldability, etc.

The average molecular weight of the polycarbonate is preferably 5,000 to 200,000, more preferably 8,000 to 100,000. A polycarbonate having an average molecular weight smaller than 5,000 sometimes causes poor heat-resistance, etc., and the average molecular weight exceeding 200,000 may cause the failure in getting the objective optical characteristics. The average molecular weight is, unless otherwise indicated, a number-average molecular weight reduced to polystyrene and measured by GPC (gel-permeation chromatography). Conventional polycarbonate can be used for the purpose. In addition to the above, a polycarbonate produced by using bisphenol A as a main component or a polycarbonate produced by copolymerizing bisphenol A with other component can be suitably used in the present invention. The other component is, for example, bis(4-hydroxyphenyl)methane, 1,1-bis(4-hydroxyphenyl) cyclohexane, 9,9-bis(4-hydroxyphenyl)fluorene, 1,1-bis(4-hydroxyphenyl)-3,3,5-trimethylcyclohexane, 2,2-bis(4-hydroxy-3-methylphenyl)-propane, 2,2-bis(4-hydroxyphenyl)-2-phenylethane, 2,2-bis(4-hydroxyphenyl)-1,1,1,3,3,3-hexafluoropropane, bis(4-hydroxy-phenyl) diphenylmethane, bis(4-hydroxyphenyl)sulfide and bis(4-hydroxyphenyl)sulfone. The amount of the component is 20 mol % or less, preferably 10 mol % or less based on the total recurring unit of the polycarbonate. A part of the polycarbonate may be substituted with e.g. a polyester carbonate containing terephthalic acid component and/or isophthalic acid component for improving the properties of the polycarbonate such as heat-resistance and solubility.

Especially preferable polycarbonate is poly-4,4'-dioxydiphenyl-2,2-propane carbonate produced by using bisphenol A as a main component of bisphenol from the viewpoints of the availability of the materials and the drawing easiness of the film.

The micro void-containing oriented film of the present invention is a drawn film having main chains of the above thermoplastic polymer mainly extending in a state oriented in one direction and containing a number of micro voids in the film. The voids can be observed by observing the cross-section of the film with a scanning electron microscope at a magnification of 1,000 or above. Especially when the oriented film is a uniaxially drawn film, the numerous micro voids can be observed on the cross-section perpendicular to the film surface and parallel to the drawing direction. The circumstance is described in detail by the photograph of the FIG. 1 as an example of the structure of the cross-section of a film observed by a scanning electron microscope in Example 1. In the FIG. 1, the part darker than the surrounding part is a micro void. These numerous microvoids are present in the film in a state separated from each other. The observed forms are true circles or circles or triangles slightly elongated in the uniaxially drawn direction. The size of individual void is generally in the range of 0.005 to 10 μm.

Figure 11:
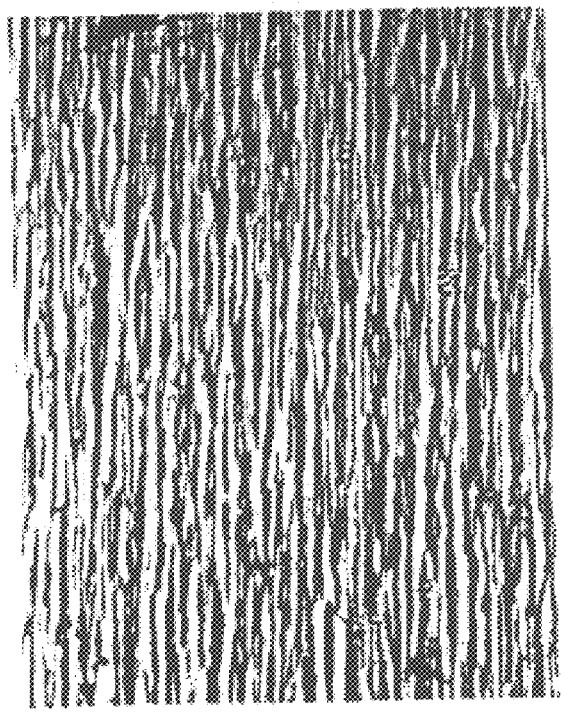
FIG. 11 is an image of the film of the Example 2 of the present invention photographed by a transmission optical microscope (magnification: 400). The lateral direction of the figure is the drawing direction.
Figure 13:
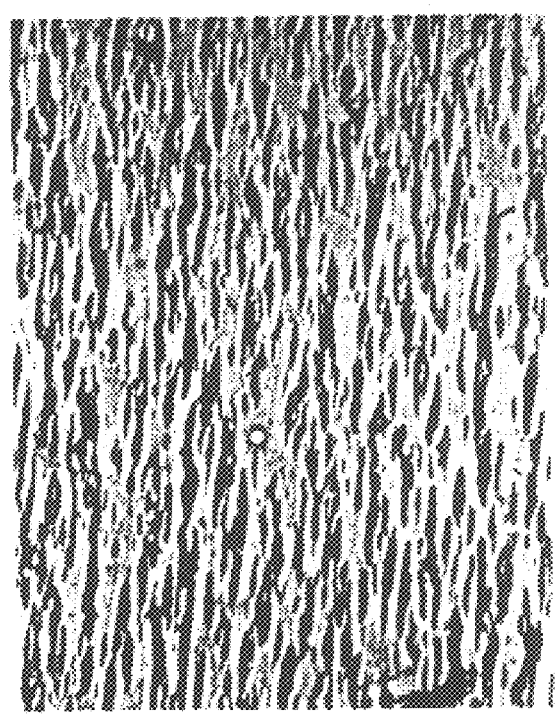
FIG. 13 is an image of the film of the Example 4 of the present invention photographed by a transmission optical microscope (magnification: 400). The lateral direction of the figure is the drawing direction.

The inner part of the micro void-containing film of the present invention was observed from the film surface by an optical microscope in a plane parallel to the surface (FIGS. 11 and 13). Microscopic bright parts and dark parts are present in the plane in a nearly uniformly dispersed state. Each of the microscopic dark part contains one or a number of the above-mentioned micro voids. The dark appearance is supposed to be caused by the decrease in the transmittance induced by the scattering of light by the void. The microscopic dark part, that is the microscopic optical dark area has a width of generally 0.05 to 40 μm and is extended nearly perpendicular to the drawing direction of the film.

The micro void-containing oriented film of the present invention has a function to vary the light-scattering property with an incident angle of light. Although the detailed mechanism to develop such a particular optical property is unknown, a number of micro voids in the film are supposed to have contribution to the mechanism. Namely, it is supposed that a periodically varying refractive index distribution formed by these numerous micro voids forms a structure like a diffraction grating to contribute to the optical property to vary the light-scattering property with angle.

The thickness of the micro void-containing oriented film of the present invention is preferably about 1 μm to 400 μm, more preferably 5 μm to 200 μm.

The micro void-containing oriented film of the present invention is composed of a thermoplastic polymer containing a number of micro voids in the film. The film is essentially free from the other materials, other than these voids, influencing on the light-scattering property which develops the excellent effect of the present invention. The micro void-containing oriented film of the present invention can be produced advantageously by the following process.

The present invention provides a process for the production of a micro void-containing oriented film having transmitted light scattering property varying with angle by an uniaxial drawing of a film made of a thermoplastic polymer under temperature and draw ratio conditions to form grooves on the surface of the film perpendicular to the drawing direction.

Accordingly, grooves extending nearly perpendicular to the drawing direction can be observed on the surface of the film of the present invention produced by uniaxial drawing.

Figure 10:
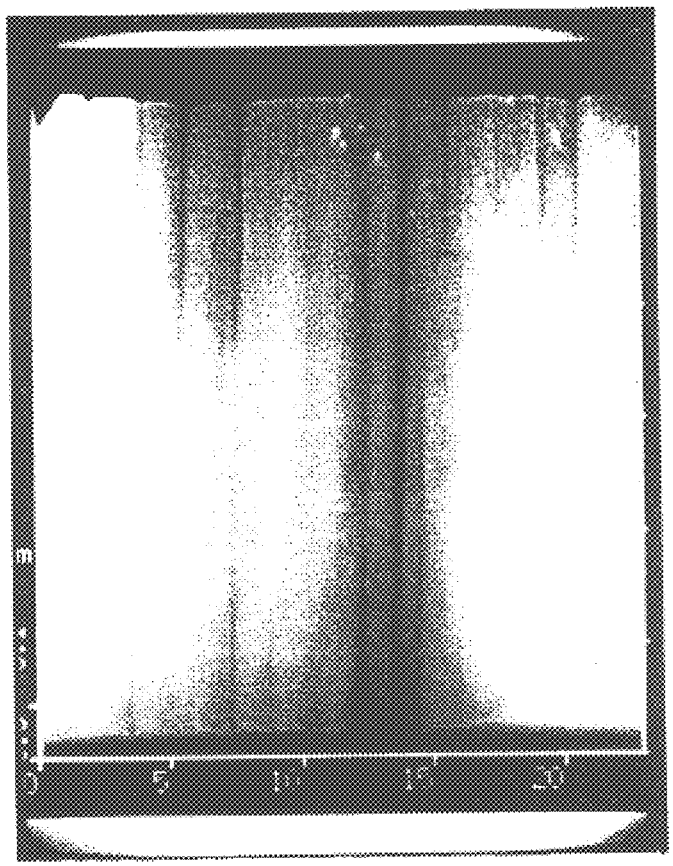
FIG. 10 is an image of the surface of the film of the Example 2 of the present invention photographed by an atomic force microscope. The lateral direction of the figure is the drawing direction.
Figure 12:
FIG. 12 is an image of the surface of the film of the Example 3 of the present invention photographed by an atomic force microscope. The lateral direction of the figure is the drawing direction.

The groove can be observed by an atomic force microscope as shown in the FIGS. 10 and 12. One or plural grooves extending perpendicular to the drawing direction are present on the film surface in an arbitrary area of 20 μm square, and the variation of the angle of the groove direction is usually within ±20° from the direction perpendicular to the drawing direction. Preferably, the length (a) of the groove is 5 μm or more, the width (b) of the groove is 0.01 to 15 μm, the depth of the groove is 1 to 200 nm and the length a(μm) to width b(μm) ratio (a/b) is 1.5 or more. More preferably, the variation of the groove direction is within ±10°, the length of the groove is 6 μm or more, the width of the groove is 0.05 to 12 μm, the depth of the groove is 2 to 150 nm and the length a(μm) to width b(μm) ratio (a/b) is 2.0 or more.

The uniaxial drawing is generally carried out by free-width uniaxial drawing or fixed-width uniaxial drawing. For getting the desirable optical characteristics of the present invention, the free-width uniaxial drawing to generate tension exclusively in one direction is preferable. Especially preferable method is a free-width longitudinal uniaxial drawing. The drawing may be performed in wet state or dry state and the mode can be properly selected according to the nature of the thermoplastic polymer used as the material of the film.

The oriented film of the present invention contains a number of micro voids in the film formed by the above method, i.e. the uniaxial drawing in a state to form grooves on the film surface perpendicular to the drawing direction. The uniaxial drawing is usually performed at an elongation considerably larger than the elongation at yield point and a temperature below the glass transition temperature (Tg) of the film. The sizes, numbers, existing ratio, etc., of the grooves formed on the film surface and the numerous micro voids formed in the film are influenced by the draw ratio, draw temperature, etc. Accordingly, an oriented film having desired scattering characteristics can be produced by the proper selection of these conditions.

According to the present invention, a film having the afore-mentioned excellent characteristics can be produced from a film made of a thermoplastic polymer, without using e.g. a step to immerse the film in a solvent nor winding the film on a roll to apply a strain to the film, by uniaxially drawing the film in a manner mentioned above to form a number of micro voids in the film.

Necking phenomenon takes place in the uniaxial drawing of a film at the yield point or thereabout or after passing the yield point. Further continuation of drawing causes the generation of voids in the film and thereafter the film is broken. The oriented film of the present invention exhibiting unique light-scattering characteristics can be produced by drawing a film made of a thermoplastic polymer at a neck-in ratio selected preferably within the range of 25 to 70%. The neck-in ratio is defined by the formula $100 \times (A-B)/A$ (%) wherein A is the film thickness before drawing and B is the thickness after drawing. In the case of performing the uniaxial drawing by a multi-stage drawing process, the neck-in ratio of the film is preferably fallen in the above range after the completion of all drawing steps. The neck-in ratio is preferably 35 to 60% for a polycarbonate film.

In the case of producing the oriented film of the present invention by the longitudinal uniaxial drawing of a polycarbonate as the thermoplastic polymer, the drawn film can be produced by drawing at a draw ratio of 1.8 to 3.0. The draw ratio is preferably 2.3 to 3.0 especially for the production of a film scattering the light entering from the front side (θ min<θ max), and is 1.8 to 2.3 for the production of a film scattering the light slantly entering to the film (θ min>θ max). In the case of a multi-stage drawing, the draw ratio is preferably fallen within the above range after the completion of all drawing steps. The drawing temperature in the uniaxial drawing is preferably below the Tg of the film, more preferably within the range of Tg-50(° C.) to Tg.

The situation is explained below on an unoriented film produced by a wet-film forming process from a dope prepared by dissolving a polycarbonate (poly-4,4'-dioxydiphenyl-2,2-propane carbonate) derived from 4,4'-dihydroxydiphenylpropane (bisphenol A) and phosgene in methylene chloride. The unoriented film is preferably drawn at a drawing temperature D (° C.) of Tg'-50≦D≦Tg', preferably Tg'-30≦D≦Tg' and a neck-in ratio of 35 to 60% wherein Tg'(° C.) is the glass transition temperature of the film made of the polycarbonate. Tg' is the glass transition temperature of the film containing the solvent (methylene chloride in the above case) and is dependent upon the amount of solvent in the film (decreases with increasing solvent content). The drawing at the above drawing temperature is also preferable for a film incorporated with other additives taking liquid or gaseous state at the above drawing temperature range. The drawing temperature is not necessarily restricted in the above range in the case of a film containing an additive which takes solid state at the above drawing temperature range.

The oriented film of the present invention is produced preferably by the uniaxial drawing of a film prepared by a casting film-forming process from the viewpoint of transparency and uniformity. The film may contain preferably up to 15% by weight of the solvent used in the casting process. The solvent content of the oriented film produced by drawing is preferably 3% by weight or less, more preferably 1% by weight or less.

Especially in the case of a polycarbonate, dioxolane, etc., can be used as a preferable solvent for cast film process in addition to the aforementioned methylene chloride.

The micro void-containing oriented film of the present invention usually has optical anisotropy. A uniaxially drawn film of a thermoplastic polymer is generally an optically anisotropic material exhibiting optical anisotropy having an optic axis in the drawing direction. The optical anisotropy is expressed by the product of the film thickness d and the birefringence Δn which is a difference between the refractive index in the slow optic axis direction and the refractive index in the fast optic axis direction in the plane of the film, i.e. Δn·d (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn·d since the level depends upon the application of the film, however, it is preferably 50 nm or more. The active use of the optical anisotropy of the oriented film of the present invention enables e.g. the production of even a film having chromatic compensation and expanded viewing angle in STN (supertwisted nematic) mode. In this case, the distribution of the direction of slow optic axis is preferably within ±10°. In the case of producing the micro void-containing oriented film of the present invention by the uniaxial drawing of a film made of a polycarbonate, the Δn·d representing the optical anisotropy may be 200 nm or over measured at a wavelength of 590 nm. A film having a Δn·d value of 200 nm or more can be used also as a color compensation film for e.g. a liquid crystal display device.

The viewing angle of a liquid crystal display device can be improved by the use of the oriented film of the present invention. The oriented film is preferably positioned at the side of the observer relative to the liquid crystal layer. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. The oriented film of the present invention can increase the viewing angle of a liquid crystal display device because the film has excellent angle-specific light-scattering property to expand mainly the light of a direction of excellent visibility to a specific directions. Although the above effect can be achieved even by the single use of such oriented film, plural number of films may be used in combination. The maximum parallel ray transmittance (Tmax(%)) defined by the formulas (I) and (II) is preferably 20% or more in the case of using the film of the present invention as a viewing angle improvement film for a liquid crystal display device.

In a liquid crystal display device furnished with a polarizing plate, the oriented film of the present invention is necessary to be positioned at the observer's side relative to the liquid crystal layer without distinction of the outer side or inner side of the polarizing plate. When the oriented film of the present invention has optical anisotropy and the anisotropy causes a problem of interference colour, etc., in the case of attaching the film at the inner side of the polarizing plate, the problem can be avoided by coinciding the polarization axis or the absorption axis of the polarizing plate to the fast optic axis or slow optic axis of the oriented film. Similarly, when the oriented film is pasted to the outside of the polarizing plate and a problem such as interference colour is produced by the optical anisotropy of the oriented film when the liquid crystal display device is observed through polarizing glasses, the problem is also avoided by coinciding the polarization axis or the absorption axis of the polarizing plate to the fast optic axis or slow optic axis of the oriented film. When the presence of the optical anisotropy does not cause a problem in the case of using the oriented film at the outside of the polarizing plate, the film can be pasted at a proper angle according to the object. Although the oriented film of the present invention has an effect for improving the viewing angle of a liquid crystal display device even by the single use, two films may be used in a state perpendicularly crossing the drawing axes of the films to cancel the phase difference. The oriented film may be subjected to annealing treatment, etc., to cancel the optical anisotropy.

The optical properties of the viewing angle improvement film for a liquid crystal display device can be set corresponding to the liquid crystal display device for applying the film. The light condensing method using a lens sheet in a back-light system is also an important factor for improving the viewing angle. The oriented film of the present invention can increase the luminance at a specific direction and is effective for improving the viewing angle when the film is used as a light-scattering film in a back-light system. Especially, the placing of the film on a lens sheet can improve the displaying quality of a liquid crystal display device e.g. to suppress the increase in the luminance of the lens sheet viewed from a slant direction while causing little variation of the luminance of the front view.

The oriented film of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss, etc. The tacky adhesive is preferably those having a refractive index close to that of the oriented film to suppress the interfacial reflection loss of light.

Further, the oriented film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a back-light system of a liquid crystal display device. In this case, a reflection film exhibiting specular reflection can be used in general. In any of the above cases, the metal film may have e.g. a blaze-formed metal film as well as a flat mirror-like film. The use of a blaze-formed metal film enables the flexible designing of especially the directivity of the reflection intensity. The light-reflection plate can be used also for a transmission or reflection-type screen of a projection displaying device. The oriented film of the present invention is used as a light-scattering plate in the above uses. Since the scattering direction of light can be controlled by the use of the oriented film of the present invention compared with conventional light-scattering plate such as a plate produced by mixing nearly spherical beads in a resin, the film has an advantage for example to easily obtain a reflection film having high luminance at a specific direction.

Examples of such metal are stainless steel, aluminum, gold, silver, platinum and their alloys. The thickness of the metal film is preferably between 10 and 10,000 Å. Plural number of such oriented films may be used in combination and laminated with a reflection film. The lamination of the metallic film can be carried out by conventional sputtering technology, coating technology, vacuum evaporation technology, sol-gel coating technology, etc.

The formation of the blaze-formed metal film is carried out e.g. by the following two methods. One is a method to form a desired blaze-formed mold, transfer the form to a surface of the film of the present invention under heating and laminate a metal film to the blaze-formed surface by sputtering or vacuum evaporation, etc. The other method is to similarly form a blaze-formed mold, hold a photosetting or thermosetting resin, etc., between the mold and the film of the present invention, remove the mold after curing the resin and laminate the metal film on the blaze-formed surface by sputtering, vacuum evaporation, etc.

The reflection film formed by applying a reflection layer composed of a metallic film, etc., to the oriented film of the present invention can be used e.g. as a retroreflective member for a traffic sign. It can be used in a state applied to a car, a bicycle, person, etc. This reflection film is produced by taking advantage of the property of the film to strongly reflect the incident light to a direction nearly same as the direction of the incident light when the incident light is on a plane nearly parallel to the orientation direction (drawing direction) of the oriented film and applied to the reflection member from the side of the oriented film. Plural number of the oriented films may be used in combination in the above case.

As another use, the oriented film of the present invention can be used as a viewing angle control film to control the viewing angle in such a manner as to allow the clear view of the scene through the oriented film when viewed at a certain direction and give an indistinct view from a different direction taking advantage of the property to vary the light transmittance with the incident angle e.g. by laminating the oriented film to a glass plate for building material or a transparent polymer sheet. In the case of using the film as the viewing angle control film, the maximum light transmittance (Tmax(%)) defined by the formulas (I) and (II) is preferably 20% or above.

The oriented film of the present invention is possible to have various optical characteristics. For example, when the scattering state of an outgoing light obtained by projecting light at an incidence angle to give the minimum light transmittance of the oriented film is not isotropic but anisotropic, an obscure glass having a specific scattering property different from a so-called ground glass can be supplied e.g. for building material or automobile use from the viewpoint of daylighting in a room by laminating the oriented film to a glass plate for building material or a transparent polymer film or sheet.

Figure 5:
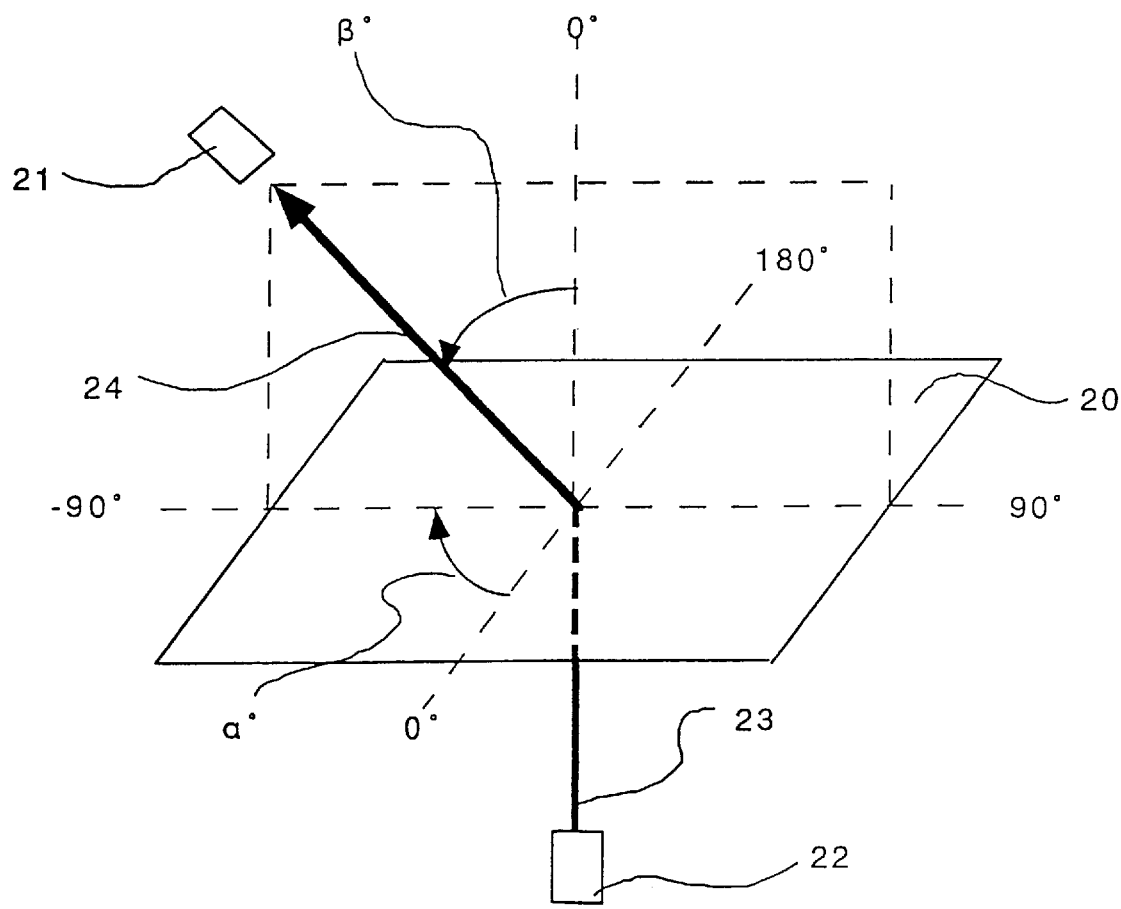
FIG. 5 is a schematic drawing of an optical system for the determination of scattered state of the outgoing light by the incidence of a parallel ray.

The anisotropic scattering state means a phenomenon to vary the detected intensity of the outgoing light with the detection angle α (°) by varying the angle α while keeping the constant β (°) value in an optical system shown by the FIG. 5, wherein α is the detecting direction of the outgoing light on the specimen plane when the detection direction of the outgoing light is projected on the specimen plane and β is the angle between the detecting direction of the outgoing light and an incident angle of the incident light. In the FIG. 5, the sign 20 is a specimen film, 21 is a detector, 22 is a light source, 23 is incident light and 24 is outgoing scattered light.

The oriented film of the present invention may be subjected to conventional hard-coat treatment, antireflection treatment, antiglare treatment, etc. at one or both surfaces. A photosetting resin or a thermosetting resin such as acrylic polymer or silicone polymer or a metal oxide such as silicon oxide, etc., is used in the above treatment. A tacky adhesive may be used in the treatment. Further, a metallic film may be formed on the oriented film to impart the film with oxidation resistance.

Furthermore, the oriented film of the present invention can be used as an electrode by laminating a transparent conductive layer composed of indium oxide represented by ITO film.

The oriented film of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The thickness of the film or sheet is preferably 0.01 to 5 mm.

The oriented film of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or metal oxide or a filler. The amount of the additive is preferably 10% by weight or less based on the thermoplastic polymer.

This invention provides a film which scatters the incident light depending upon an incident angle of the light in the course of transmitting through the film, i.e. a controllable light-scattering film, by uniaxially drawing a film made of a thermoplastic polymer. Such film is oriented in the drawing direction and an incident angle to cause the light-scattering can be varied by properly selecting the drawing conditions to obtain a film meeting the object. The oriented film of the present invention can be produced by using a conventional film-manufacturing facility in high productivity and has a great industrial significance.

The present invention is further explained by the following Examples, which do not restrict the scope of the invention.

Various properties in the Examples to be described later were evaluated as follows.

(1) The measurement of haze and total light transmittance

Values of haze and total light transmittance were measured by an integrating sphere light-transmission measuring instrument in conformity to the Japanese Industrial Standard JIS K7105 (Method for Testing Optical Properties of Plastics). The evaluation was performed by using a color-difference and turbidity meter manufactured by Nihon Denshoku Kogyo Co. (COH-300A).

(2) The measurement of the incident angle dependence of parallel lay transmittance and the scattered state of outgoing light by parallel incident lay The dependence of parallel lay transmittance with incidence angle and the intensity distribution of transmitted scattered light were measured by a liquid crystal display device evaluation apparatus manufactured by Otsuka Denshi Co. (LCD 5100) and provided with an optical system having a halogen lamp as a light source and a Y luminous efficacy filter for getting a Y value defined by JIS Z8701 and placed in front of a photomultiplier detector. The angular aperture of the detector was about 3.5° and the spot on the specimen was a circle of 4 mm diameter in the case of perpendicular incident lay. The measurement was performed at 25° C. The schematic diagrams of the optical system for the determination of the incident angle dependence of parallel lay transmittance and the system for the determination of the scattered state of the outgoing light caused by the parallel incident lays are shown by the FIG. 4 and the FIG. 5, respectively. In the determination of the incident angle dependence of parallel lay transmittance, the transmittance of a blank of R=0° and θ=0° was set to 100%, and for the measurement of the scattered state of the outgoing light caused by incident parallel lays, the transmittance obtained by setting a sample at α=0° and β=0° was set to 100%. In the FIG. 4, the sign 10 is a light source, 11 is a detector, 12 is incident parallel lays and 13 is a measuring specimen. In the FIG. 5, the sign 20 is a measuring specimen, 21 is a detector, 22 is a light source, 23 is an incident parallel lay and 24 is outgoing scattered light.

(3) Measurement of the incident angle dependence of relative reflectance

The relative reflectance of a film was evaluated by using a liquid crystal display device evaluation apparatus manufactured by Otsuka Denshi Co. (LCD 5100) and provided with an optical system having a halogen lamp as a light source and a Y luminous efficacy filter for getting a Y value defined by JIS Z8701 and placed in front of a photomultiplier detector. The angular aperture of the detector was about 3.5° and the spot on the specimen was a circle of 4 mm diameter in the case of perpendicular incident light. The schematic diagram of the optical system for measurement is shown in the FIG. 16. In the FIG. 16, the sign 70 is a measuring specimen, 71 is a light source, 72 is a detector, 73 is reflected light to be measured, 74 is a measuring point and 75 is an incident parallel lay. In the measurement, the reflectance was set to 100% at an incidence angle a=−30° and a reflection angle b=30° measured by using an aluminum/stainless steel double-layer film deposited on a transparent film substrate by sputtering. The metal film is called as a reference sample hereafter.

(4) Evaluation of viewing angle in a liquid crystal display device

The viewing angle in a liquid crystal display device was evaluated by using an apparatus manufactured by Otsuka Denshi Co. (LCD 5100) and provided with an optical system having a halogen lamp as a light source and a Y luminous efficacy filter for getting a Y value defined by JIS Z8701 and placed in front of a photomultiplier detector. The angular aperture of the detector was about 3.5° and the spot on the specimen was a circle of 4 mm diameter in the case of perpendicular incident light. The schematic diagram of the optical system for measurement is shown in the FIG. 9. In the FIG. 9, the sign 51 is a liquid crystal display device, 52 is a detector and 53 is light to be measured. The measurement was carried out at 25° C.

In the Example 1, the viewing angle range giving good visibility in upper (c=180°), lower (c=0°), left (c=−90°) and right (c=90°) directions was evaluated by displaying in 8 gradations and evaluating the inversion of gradient, the darkening of image, the whitening of image and the contrast with reference to the method described in SOCIETY FOR INFORMATION DISPLAY INTERNATIONAL SYMPOSIUM DIGEST OF TECHNICAL PAPERS/VOLUME XXIV, p561–564 (1993).

(5) Observation of the cross-section of a film by a scanning electron microscope The cross-section of a film was formed by breaking the film in frozen state in liquid nitrogen and was coated with a platinum film of about 3 nm thick. The electron microscope used in the observation was a scanning electron microscope manufactured by Hitachi Ltd. (commercial name: S-900). The accelerating voltage was 3.0 kV.

(6) Observation of the film surface by an atomic force microscope

An arbitrary area of 20 μm square on a film surface was observed by an atomic force microscope manufactured by Seiko Denshi Kogyo Co. (commercial name: SFA300).

(7) Measurement of glass transition temperature

The glass transition temperature of a film was measured by using a differential thermal analyzer manufactured by TA Instruments Japan Ltd. (commercial name: DSC2920) and its analysing software. The maximum inclination point near the region developing a change characteristic to glass transition in a DSC chart was defined as the glass transition point. The temperature increasing rate was 20° C./min.

(8) Measurement of spectral transmittance

The spectral transmittance of a film was determined by a spectral transmission measuring apparatus having a double-beam parallel light and manufactured by Hitachi Ltd. (commercial name: U-3500).

(9) Measurement of optical anisotropy

The optical anisotropy of a film was evaluated by the value of $\Delta n \cdot d$ ($\Delta n$ is birefringence and d is film thickness) at a measuring light wavelength of 590 nm. The measurement was carried out by using a spectral ellipsometer furnished with an photoelastic modulation element and a monochrometer, having a xenon lamp as a light source and manufactured by Nihon Bunko Co. (commercial name: M150).

EXAMPLE 1

A transparent undrawn film having a width of 15 cm and a thickness of 75 μm and exhibiting the properties shown in the Table 1 was produced by the cast film-forming of a polycarbonate (a poly-4,4,-dioxydiphenyl-2,2-propane carbonate produced by Teijin Kasei Co. (commercial name: C1400) and having a number-average molecular weight and a weight-average molecular weight of 22,000 and 74,000, respectively, in terms of molecular weight reduced to polystyrene and measured by GPC) using methylene chloride as the solvent for casting. The glass transition point of the film was 159° C.

Figure 2:
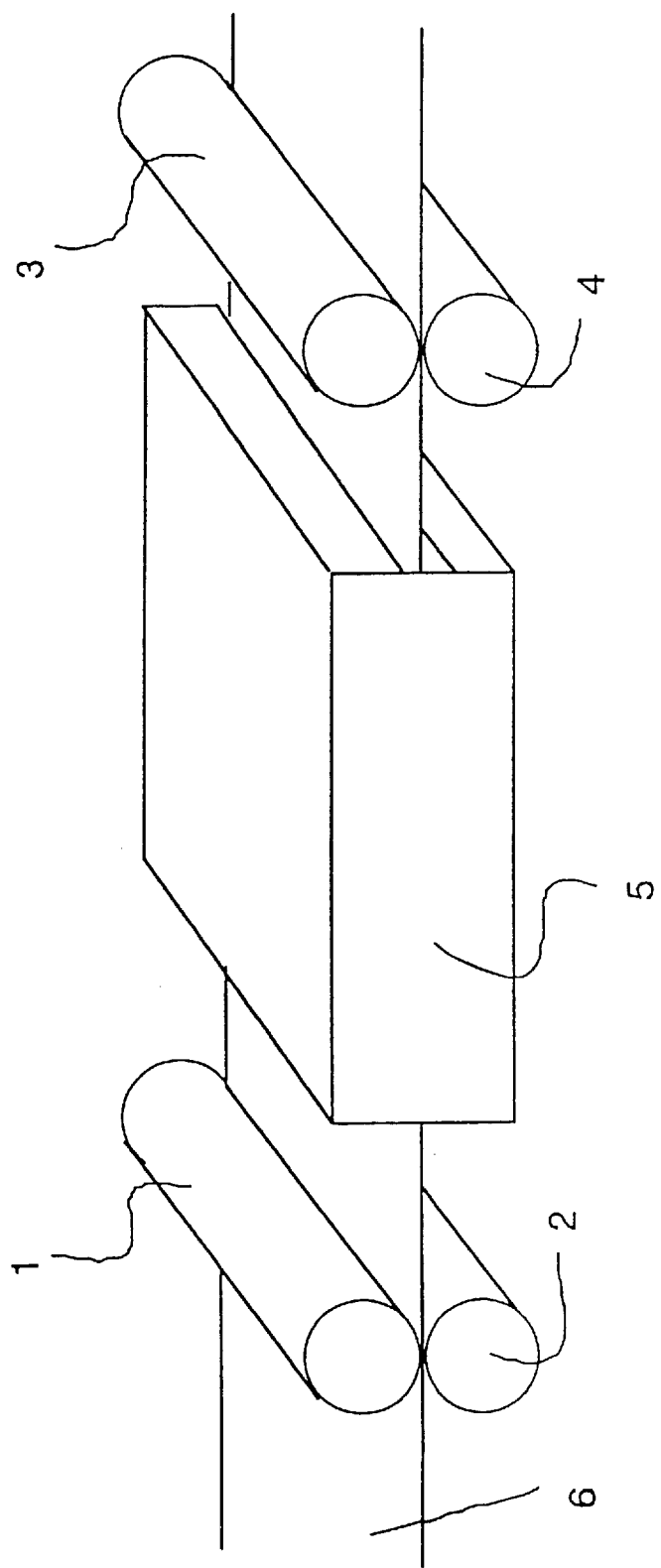
FIG. 2 is a schematic drawing of the uniaxial drawing machine of the Example 1.

The film was drawn by a longitudinal uniaxial drawing apparatus having a heating and drawing zone of 30 cm long and 30 cm wide and shown by the schematic drawing of the FIG. 2 under the conditions shown in the Table 1 to obtain the oriented film 1 of the present invention. In the FIG. 2, the signs 1 to 4 are nip rolls, 5 is a heating and drawing zone and 6 is a thermoplastic polymer film.

Figure 3:
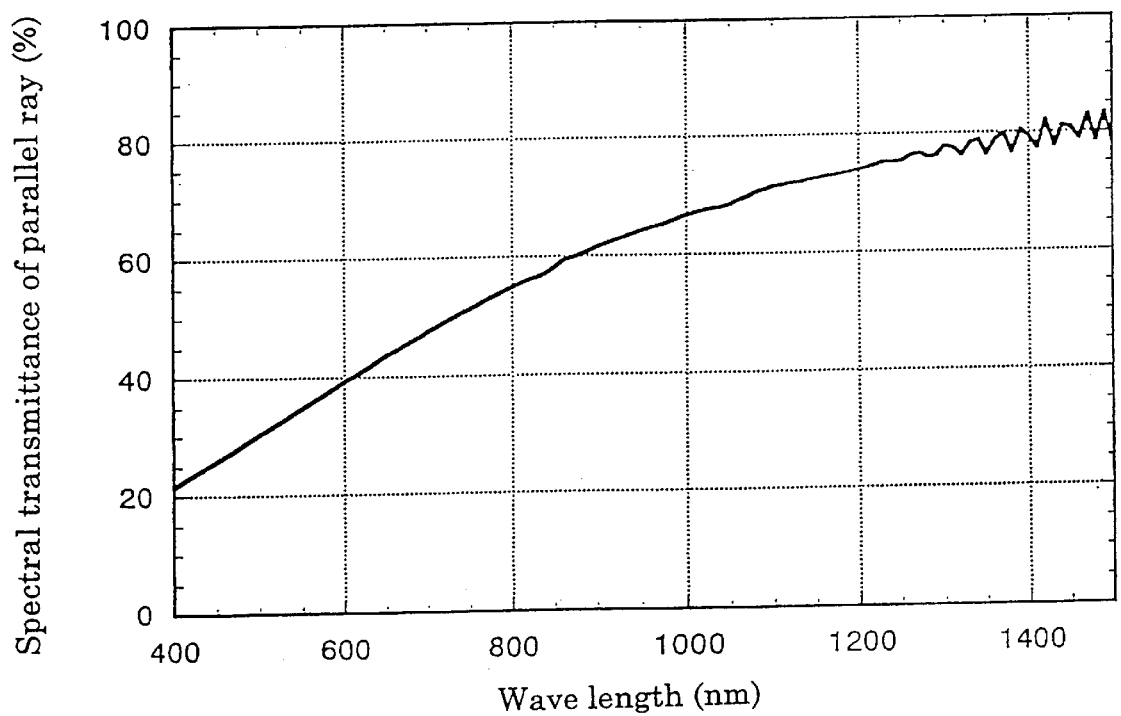
FIG. 3 is the spectral transmittance of a parallel ray through the film of the Example 1 of the present invention.
Figure 6:
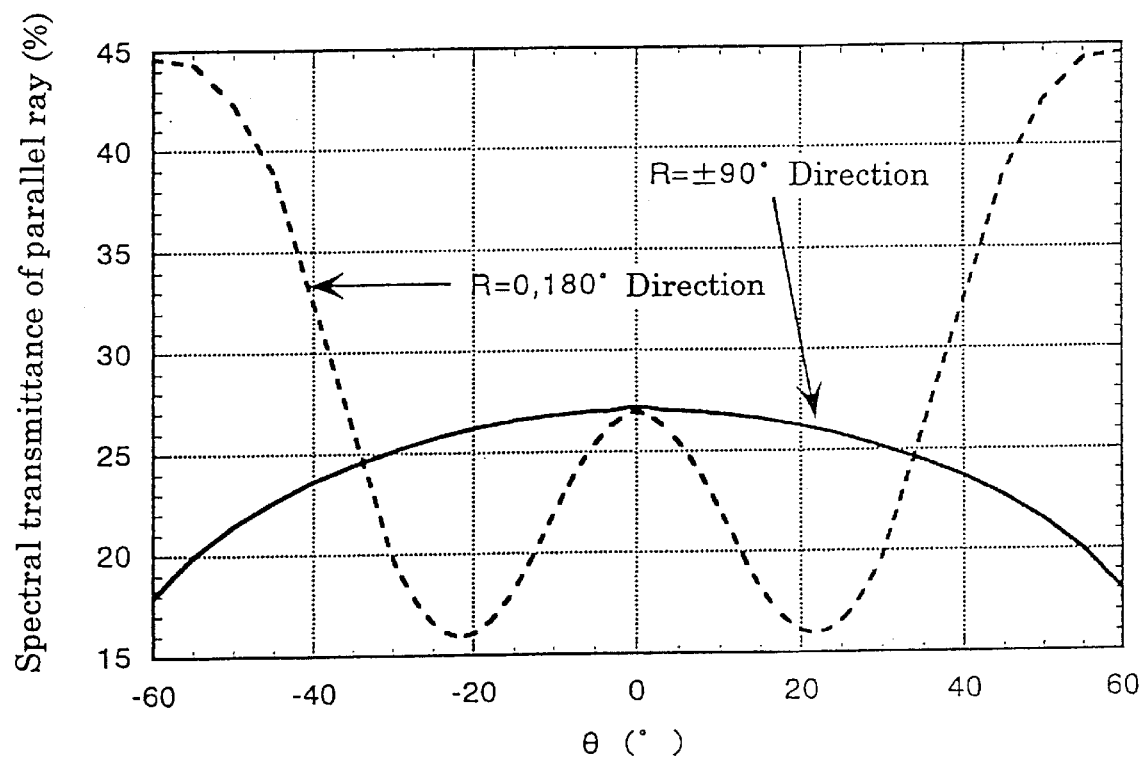
FIG. 6 is the angle dependency of the parallel ray transmittance of the film of the Example 1.
Figure 24:
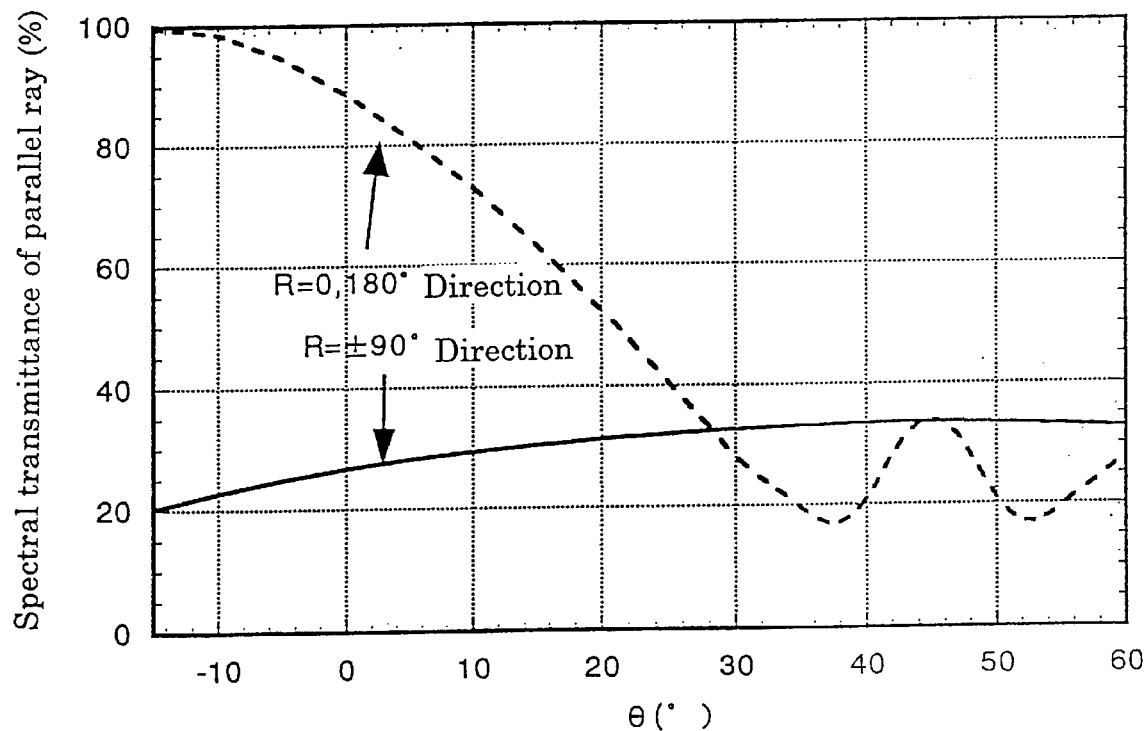
FIG. 24 is an incident angle dependence of the parallel ray transmittance of the film of the Example 9 of the present invention.

The characteristics of the film 1 produced by the above process are shown in the Table 1. FIG. 3 shows the spectral transmittance distribution in a wavelength range of 400 to 1,500 nm. The dependency of the parallel ray transmittance on R and θ measured by the optical system of the FIG. 4 is shown in the FIG. 6. In the FIG. 6, the θ is expressed by a positive value when R is 0 or 90° and a negative value when R is −90 or 180°. The values of θ are negative in the FIG. 6 because the curves of R dependence of parallel ray transmittance at R=0, 90, −90 and 180° are collectively shown in one graph, however, these negative values should be substituted as positive values in the formulas (I) and (II). In the graph of the FIG. 6, the abscissa is θ(°), the ordinate is the parallel ray transmittance (%), the real line is the results at R=±90° and the broken line is the result at R=0 and 180°. The notation shall be applied also to the following FIGS. 15, 19 and 24.

Figure 1:
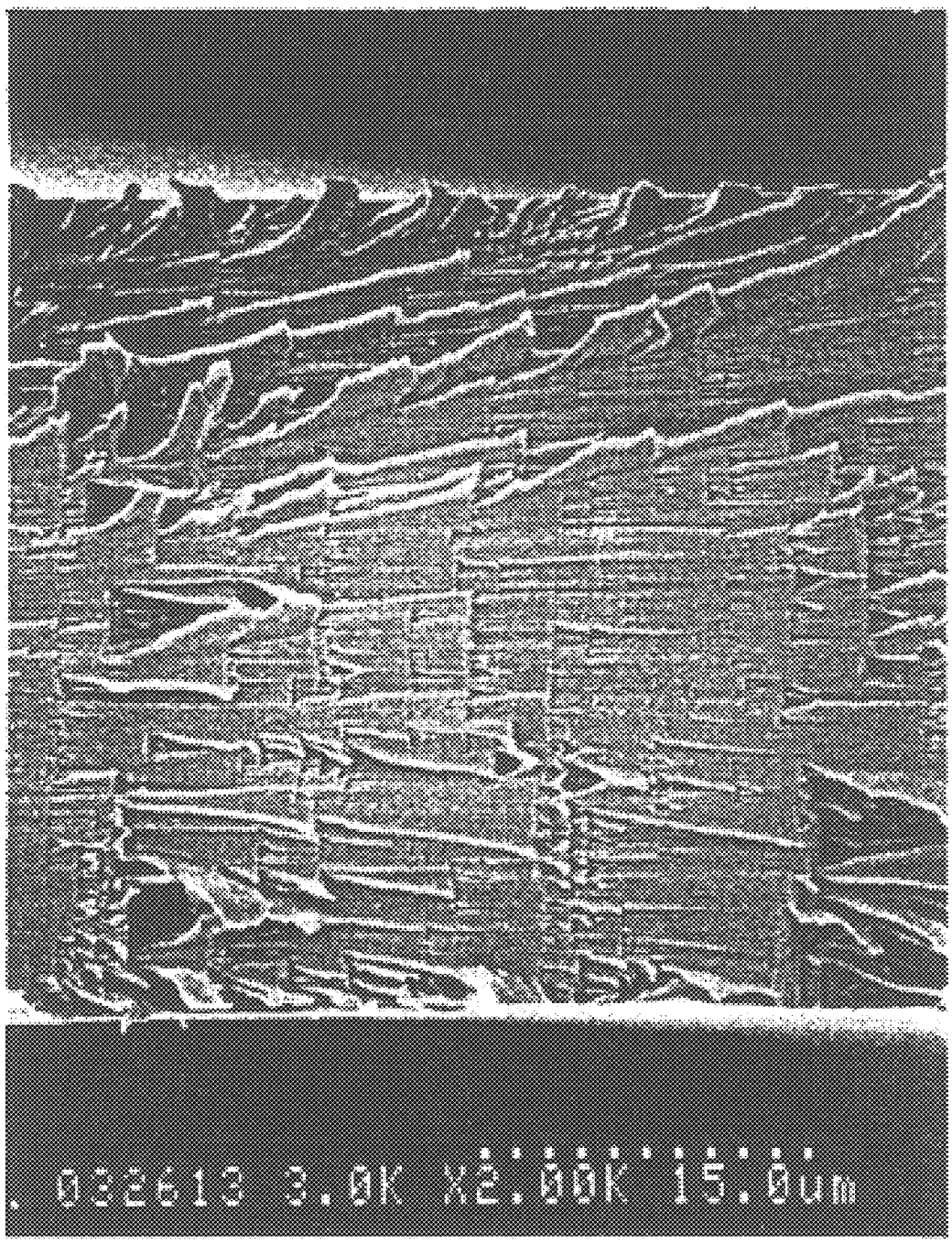
FIG. 1 is an image of a cross-section of the film of the present invention of the Example 1 perpendicular to the surface of the film and parallel to the drawing direction (the lateral direction in the figure) and photographed by a scanning electron microscope (magnification of photograph: 2,000).

The cross-section obtained by slicing a film perpendicular to the film surface and parallel to the drawing direction was observed by a scanning electron microscope. The FIG. 1 is the image taken at a magnification of 2,000 revealing the presence of a number of microscopic voids in the film.

An arbitrary area of 20 μm square of the film surface was observed by an atomic force microscope. Plural grooves each having a length of 1 μm or above, a width of 0.01 to 3 μm, a depth of 1 to 500 nm and a length to width ratio of 1.5 or above were observed and the directional distribution of the grooves in the longitudinal direction was within ±10°. The longitudinal direction of the groove was nearly perpendicular to the drawing direction.

The inside of the film 1 was observed by an optical microscope with a magnification of ×400 at nearly the middle part of the film thickness. A number of microscopic optical dark areas having dark appearance because of relatively low transmitted light intensity were observed in the film. These dark areas were extended nearly perpendicular to the drawing axis coinciding with a slow optic axis.

A thermal durability test was performed on the film 1. There was little variation in the optical characteristics of the film after the heat-resistance test at 90° C. for 1,000 hours or the wet-heat resistance test at 60° C. and 90% (relative humidity) for 1,000 hours.

A polyester acrylate monomer (M309, product of Toa Gosei Co.) containing 3% by weight of a photopolymerization initiator (Irgacure 184, product of Ciba Geigy Co.) was dissolved in 1-methoxy-2-propanol and the obtained solution was applied to both surfaces of the above film and dried. The product was irradiated with ultraviolet rays in nitrogen atmosphere to form a photoset film of 4 μm thick on the film surface.

The above optical characteristics measured on the obtained film were nearly same as those shown in the Table 1. Since there is little variation in the optical characteristics even by filling the grooves on the film surface, it is clear that the length, depth, etc., of the grooves on the film surface are not the essential factors determining the light-scattering characteristics in the present invention but the presence of the micro voids in the film essentially determines the optical characteristics.

The above film 1 was evaluated by actually attaching the film to a liquid crystal display device in the following manner. A back-light system of a commercially available note-size PC (manufactured by Nippon Electric Co. (P° C-9801NS/E)) was used as the light source for back-light. A 90° left-twist glass cell having a cell gap of 8.1 μm and provided with an ITO and a polyimide was used as the liquid crystal cell. A 90° twist nematic cell was prepared by using a liquid crystal of Merck (ZLI2293) containing 0.5% by weight of a liquid crystal of Merck (S811). The area of the ITO corresponding to the displaying part was 1 by 1 cm². A twist nematic liquid crystal display device of normally white mode was produced by pasting polarizing films (product of Sanritz Co., LLC2-9218S) to both sides of a liquid crystal cell with a tacky adhesive and placing the product on the aforementioned back-light system. In the FIG. 7, the sign 30 is a back-light, 31 is a polarizing film of the back-light side, 32 is a polarizing film transmission axis of the back-light side, 33 is a glass substrate of the back-light side, 34 is the rubbing direction of the oriented polyimide film formed on the glass substrate of the back-light side, 35 is a glass substrate of the observer's side, 36 is the rubbing direction of the oriented polyimide film formed on the glass substrate of the observer s side, 37 is the polarizing film of the observer's side, and 38 is the direction of the polarizing film transmission axis of the observer's side.

The viewing angle of the above film was evaluated by the aforementioned evaluation method. The film had a viewing angle range of 20°, 30°, 10° and 10° in the left direction (c=−90°), right direction (c=90°), lower direction (c=0°) and upper direction (c=180°), respectively.

Figure 8:
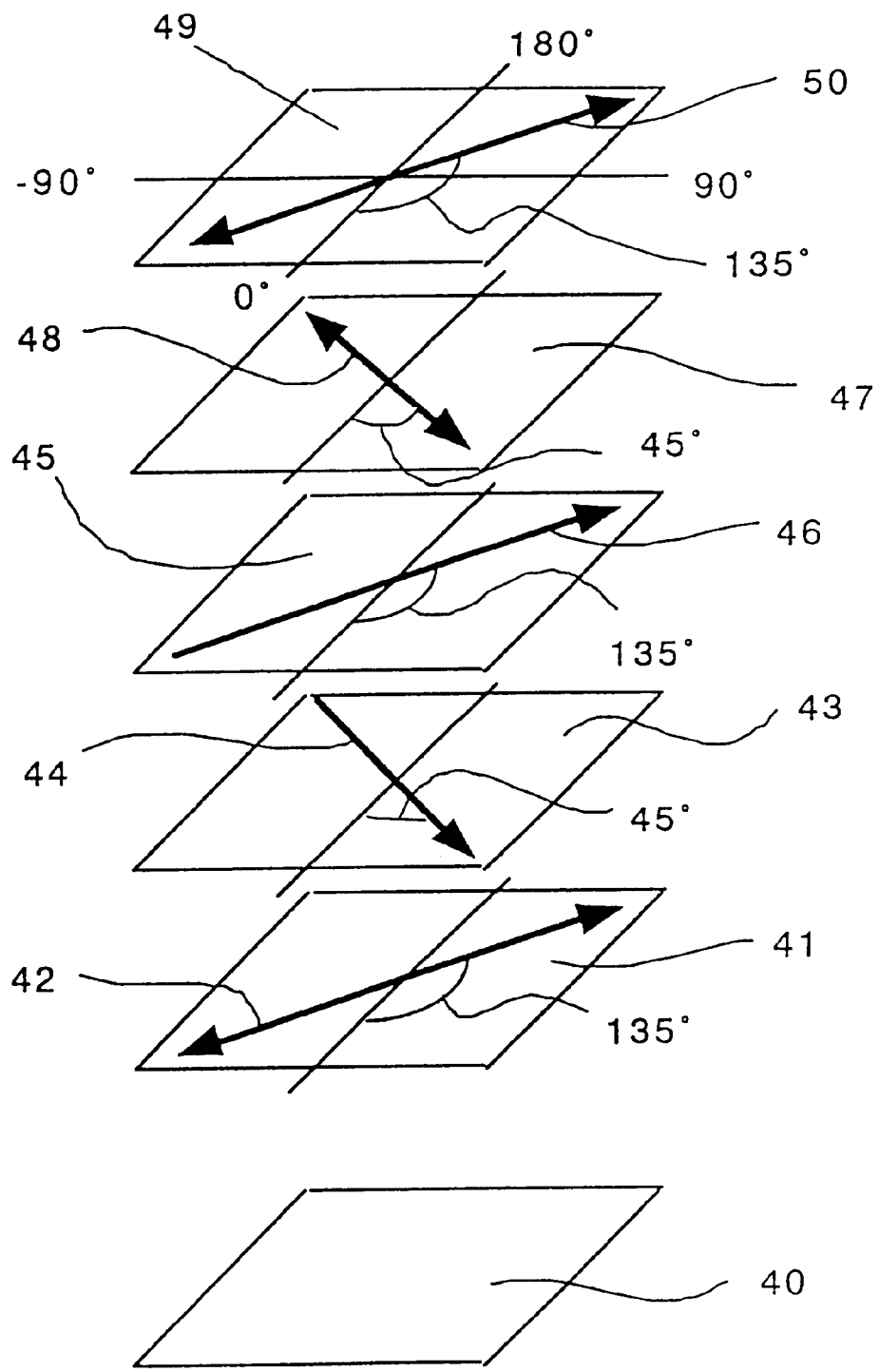
FIG. 8 is a schematic drawing of a liquid crystal display device provided with the film of the Example 1 of the present invention.

The film produced by the above-mentioned method was pasted to a polarizing film with a tacky adhesive as shown schematically in the FIG. 8 and evaluated by the similar manner. In the FIG. 8, the sign 40 is a back-light, 41 is a polarizing plate of the back-light side, 42 is the polarizing film transmission axis of the back-light side, 43 is the glass substrate of the back-light side, 44 is the rubbing direction of the oriented polyimide film formed on the glass substrate of the back-light side, 45 is a glass substrate of the observer's side, 46 is the rubbing direction of the oriented polyimide film formed on the glass substrate of the observer's side, 47 is the polarizing film of the observer's side, 48 is the direction of the polarizing film transmission axis of the observer's side, 49 is the film of the present invention, and 50 is the drawing axis direction of the film 1 of the present invention. A laminated polarizing film having a constitution of polarizing film/adhesive layer/the film 1 of the present invention is pasted to the glass substrate of the observer's side with an adhesive layer.

The film was evaluated according to the aforementioned evaluation method, and the viewing angle range was 30°, 30°, 20° and 20° in the left direction (c=−90°), right direction (c=90°), lower direction (c=0°) and upper direction (c=180°), respectively. Accordingly, the viewing angle range can be expanded by the use of the above film 1.

Figure 7:
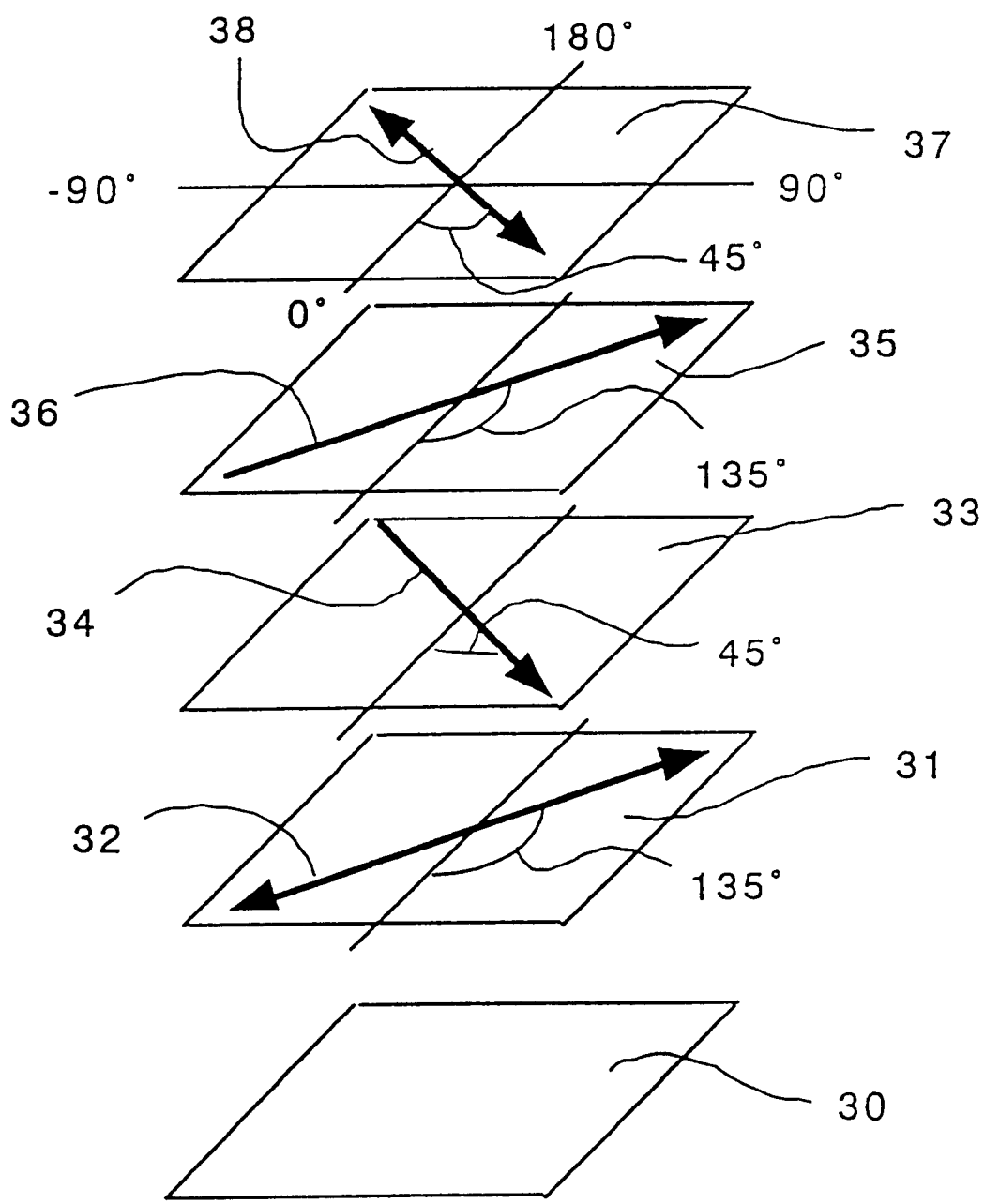
FIG. 7 is a schematic drawing of a liquid crystal display device free from the film of the Example 1 of the present invention.
Figure 9:
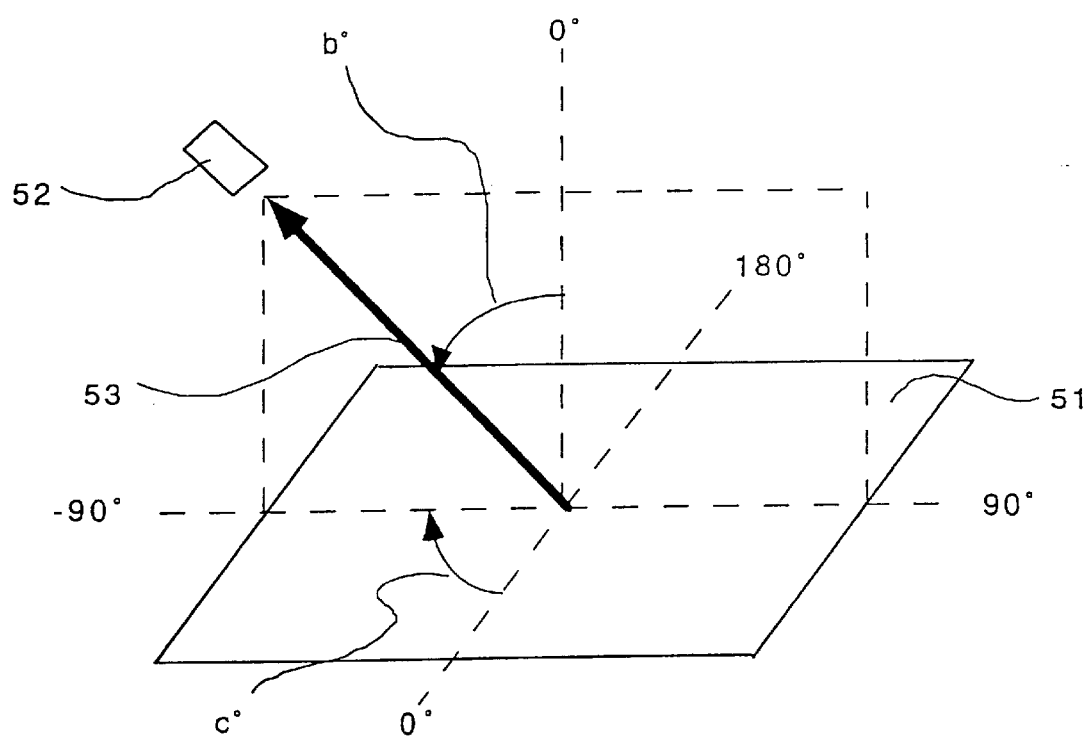
FIG. 9 is a schematic drawing of the optical system for the measurement of a liquid crystal display device.

The definitions on the angles shown in the constitution diagrams of FIGS. 7 and 8 and the angles of the upper, lower, left and right directions are same as those described in the measuring optical system of the FIG. 9.

EXAMPLE 2

A transparent undrawn film having a width of 23 cm and a thickness of 75 μm and exhibiting the properties shown in the Table 1 was produced by the melt extrusion film-forming of a polycarbonate (a poly-4,4'-dioxydiphenyl-2,2-propane carbonate having a number-average molecular weight and a weight-average molecular weight of 14,000 and 45,000, respectively, in terms of molecular weight reduced to polystyrene and measured by GPC). The glass transition point of the film was 154° C.

The objective film 2 was produced from the obtained transparent undrawn film by the longitudinal uniaxial two-stage drawing with a drawing machine used in the Example 1 under the drawing conditions shown in the Table 1.

The optical characteristics of the obtained film 2 are shown in the Table 1.

The presence of a number of micro voids was confirmed, similar to the Example 1, by the scanning electron microscope observation of a cross-section formed by slicing the film 2 perpendicular to the film surface and parallel to the drawing direction.

An arbitrary area of 20 μm square on the surface of the film was observed by an atomic force microscope similar to the Example 1, and the image is shown in the FIG. 10. The lateral direction of the Figure is the drawing direction. Several grooves were observable in the FIG. 10. The groove nearly in the middle of the Figure had a length of 20 μm or more, the widths of 0.7 μm, 0.6 μm and 0.6 μm at both ends and middle part, respectively, and a depth of 19 nm each at both ends and the middle part. The longitudinal direction of the groove was nearly perpendicular to the drawing direction. The presence of similar grooves was observed on the reverse face of the film.

The inside of the film 2 was observed by an optical microscope with a magnification of ×400 and the obtained image is shown in the FIG. 11. A number of microscopic optical dark areas extending nearly perpendicular to the drawing axis (the lateral direction in the Figure) corresponding to the slow optic axis were observed.

The thermal durability test of the film 2 was performed similar to the Example 1 and there was little change in the characteristics after the test.

Similar to the Example 1, photoset films of 4 μm thick were formed on both surfaces of the film 2 and the above optical characteristics were measured to get the results almost same as those shown in the Table 1.

The film 2 was pasted on a transparent glass plate of 2 mm thick with a tacky adhesive. The film was cloudy and the scene was not clearly observable when viewed perpendicular to the film, however, the transparency of the film was gradually increased according to the change of the viewing angle toward the drawing direction to attain a clear view of the scene.

EXAMPLE 3

A transparent undrawn film having a width of 15 cm and a thickness of 75 μm and exhibiting the characteristics shown in the Table 1 was produced by a method similar to the Example 1. The film had a glass transition temperature of 119° C.

The objective film 3 was produced by the longitudinal uniaxial drawing of the obtained transparent undrawn film with a drawing machine used in the Example 1 under drawing conditions shown in the Table 1.

The optical characteristics of the obtained film 3 are shown in the Table 1.

The presence of a number of micro voids was confirmed, similar to the Example 1, by the scanning electron microscope observation of a cross-section formed by slicing the film 3 perpendicular to the film surface and parallel to the drawing direction.

An arbitrary area of 20 μm square on the surface of the film was observed by an atomic force microscope similar to the Example 1, and the image is shown in the FIG. 12. The lateral direction of the Figure is the drawing direction. Several number of grooves were observable in the FIG. 12. The groove nearly in the middle of the FIG. 12 had a length of 12 μm or more, the widths of 5 μm, 4 μm and 6 μm at both ends and middle part, respectively, and depths of 50 nm, 40 nm and 80 nm at both ends and middle part, respectively. The longitudinal direction of the groove was nearly perpendicular to the drawing direction. The presence of similar grooves was observed on the reverse face of the film.

The inside of the film 3 was observed by an optical microscope with a magnification of ×400. A number of microscopic optical dark areas extending nearly perpendicular to the drawing axis corresponding to the slow optic axis were observed.

The thermal durability test of the film 3 was performed similar to the Example 1 and there was little change in the characteristics after the test.

Similar to the Example 1, photoset films of 4 μm thick were formed on both surfaces of the film 3 and the above optical characteristics were determined to get the results almost same as those shown in the Table 1.

The film 3 was pasted on a transparent acrylic resin plate of 4 mm thick with a tacky adhesive. The film was cloudy and the scene was not clearly observable when viewed perpendicular to the glass, however, the transparency of the film was gradually increased according to the change of the viewing angle toward the drawing direction to attain a clear view of the scene.

EXAMPLE 4

A transparent undrawn film having a width of 15 cm and a thickness of 75 μm and exhibiting the characteristics shown in the Table 1 was produced by a method similar to the Example 1. The film had a glass transition temperature of 119° C.

The objective film 4 was produced by the longitudinal uniaxial drawing of the obtained transparent undrawn film with a drawing machine used in the Example 1 under drawing conditions shown in the Table 1.

The optical characteristics of the obtained film 4 are shown in the Table 1.

The presence of a number of micro voids was confirmed by the scanning electron microscope observation of a cross-section formed by slicing the film 4 perpendicular to the film surface and parallel to the drawing direction similar to the Example 1.

An arbitrary area of 20 μm square on the surface of the film was observed by an atomic force microscope similar to the Example 1. A plurality of grooves having a length/width ratio of 1.5 or above were observable and the directional distribution of the longitudinal direction of the groove was within ±10°. Similar grooves were present on the reverse face of the film.

The inside of the film 4 was observed by an optical microscope with a magnification of ×400. The image is shown in the FIG. 13. The lateral direction of the Figure is the drawing direction. A number of microscopic optical dark areas extending nearly perpendicular to the drawing axis corresponding to the slow optic axis were observed.

The thermal durability test of the film 4 was performed similar to the Example 1 and there was little change in the characteristics after the test.

Similar to the Example 1, photoset films of 4 μm thick were formed on both surfaces of the film 4 and the above optical characteristics were determined to get the results almost same as those shown in the Table 1.

A single layer of the film 4 was pasted on a polarizing film of an STN (supertwist nematic) mode liquid crystal display device of a note-size personal computer manufactured by Fujitsu Ltd. (FMV-575NU/Y) with a tacky adhesive directing the drawing axis of the film in the vertical direction of the screen. That is, a laminated elliptic polarization film consisting of an optical compensation film/tacky adhesive layer/polarizing film/tacky adhesive layer/film 4 is pasted to the observer's side surface of the glass substrate with a tacky adhesive. The visual observation of the image on the device revealed that, although the viewing angle was nearly the same as the angle before the application of the film in the lateral direction of the image, the expansion of area free from the reversion of gradation and darkening of the image was confirmed in vertical direction. The effect was remarkable in the lower direction. The frontal light intensity (Y) of the film 4 was measured by a liquid crystal display device evaluation apparatus of Ohtsuka Denshi Co. (LCD5100) and the intensity was 93% when the light intensity free from the film 4 was taken as 100%.

In the case of pasting the film 4 directing the drawing axis in the lateral direction of the screen, the viewing angle in vertical direction was nearly the same as the angle free from the film, however, the expansion of area free from the reversion of gradation and the darkening of the image was confirmed in the lateral direction. The frontal light intensity (Y) and the change in the contrast in lateral direction were observed by attaching the film 4 to a liquid crystal display device evaluation apparatus of Ohtsuka Denshi Co. (LCD5100), and the intensity with the film was 97% based on the 100% light intensity of the screen free from the film. The range having a contrast of 2 or above was 120° or more (60° or more each in right and left sides) in lateral direction for a screen provided with the film in contrast to 90° (45° each in right and left sides) for a screen free from the film.

A film having an antireflection layer on a TAC (triacetyl cellulose) film was pasted to the above film 4 with a tacky adhesive layer. The surface reflection was suppressed to further improve the visibility. The above laminate has a structure consisting of a laminated elliptic polarization film having an antireflection layer and composed of an optical compensation film/tacky adhesive layer/polarizing film/tacky adhesive layer/film 4 of the present invention/tacky adhesive layer/TAC film pasted to the observer's side surface of a glass substrate with a tacky adhesive.

The antireflection layer was formed by the following manner. A polyester acrylate monomer (M309, product of Toa Gosei Co.) containing 3% by weight of a photopolymerization initiator (Irgacure 184, product of Ciba Geigy Co.) was dissolved in 1-methoxy-2-propanol and the obtained solution was applied to both surfaces of the above film 4 and dried. The product was irradiated with ultraviolet rays in nitrogen atmosphere to form a photoset film of 4 μm thick on the film surface. The antireflection layer was formed by forming a multilayer film consisting of ITO (refractive index 2.0, film thickness 240 A)/SiO$_2$ (refractive index 1.46, film thickness 240 A)/ITO (indium tin oxide: refractive index 2.0, film thickness 870 A)/SiO$_2$ (refractive index 1.46, film thickness 910 A) successively on the photoset film by sputtering.

A so-called antiglare layer having fine irregularity was formed on one surface of the film 4. The film was pasted to the above-mentioned liquid crystal display device with a tacky adhesive layer directing the drawing axis in the lateral direction of the screen and the antiglare layer toward the observer. The mirror reflection of the surface of the screen was suppressed and the visibility was further improved by this process. The antiglare layer was formed by the following manner. A solution produced by mixing 100 parts by weight of a trimethylolpropane ethylene oxide-modified acrylate (Aronix M-350, product of Toa Gosei Kagaku Co.), 7 parts by weight of 1-hydroxycyclohexyl phenyl ketone (Irgacure 184, product of Ciba-Geigy Co.) as a photopolymerization initiator, 0.1 part by weight of fine silicone particles having an average particle diameter of 4.5 μm Tospearl 145, product of Toshiba-Silicone Co.) and 200 parts by weight of 1-methoxy-2-propanol was applied to the film by roll-coating, dried at 60° C. for 1 minute and irradiated with a high-pressure mercury lamp of 120 mW/cm$^2$ to a cumulative light quantity of about 800 mJ/cm$^2$ to obtain an antiglare layer having a thickness of about 3.5 μm.

EXAMPLE 5

Figure 14:
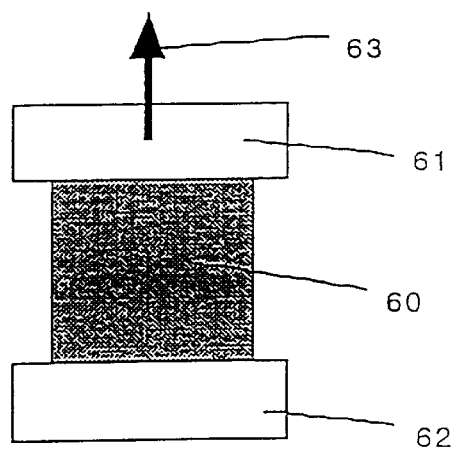
FIG. 14 is a schematic drawing of the uniaxial drawing apparatus of the Example 5.

A transparent undrawn film composed of a polyethylene naphthalate, having a width of 30 cm and a thickness of 90 μm and exhibiting the characteristics shown in the Table 1 was produced by a melt extrusion film-forming process. The viscosity-average molecular weight of the polyethylene naphthalate resin was 20,000. A specimen of 20 mm wide and 80 mm long was cut out from the film and subjected to longitudinal uniaxial drawing under the condition described in the Table 1 by fixing an end of the film in a thermostat and pulling the other end with a metallic clip as shown by the schematic drawing of the FIG. 14. In the FIG. 14, the sign 60 is a thermoplastic polymer film, 61 is a movable chuck, 62 is a stationary chuck and 63 is the moving direction of the chuck.

The optical characteristics of the produced film 5 of the present invention are shown in the Table 1.

The presence of a number of micro voids was confirmed, similar to the Example 1, by the scanning electron microscope observation of a cross-section formed by slicing the film 5 perpendicular to the film surface and parallel to the drawing direction.

An arbitrary area of 20 μm square on the surface of the film was observed by an atomic force microscope similar to the Example 1. There were plural grooves having a length/width ratio of 1.5 or above, and grooves having a directional distribution of the longitudinal direction of the groove of within ±10° were observable. The presence of similar grooves was observed on the reverse face of the film.

The inside of the film 5 was observed by an optical microscope with a magnification of ×400. A number of microscopic optical dark areas extending nearly perpendicular to the drawing axis corresponding to the slow optic axis were observed.

The thermal durability test of the film 5 was performed similar to the Example 1 and there was little change in the characteristics after the test.

Similar to the Example 1, photoset films of 4 μm thick were formed on both surfaces of the film 5 and the above optical characteristics were determined to get the results almost same as those shown in the Table 1.

EXAMPLE 6

A transparent undrawn film having a width of 23 cm and a thickness of 75 μm and exhibiting the characteristics shown in the Table 1 was produced by a method similar to the Example 1. The film had a glass transition temperature of 119° C.

The objective film 6 was produced by the longitudinal uniaxial drawing of the obtained transparent undrawn film with a drawing machine used in the Example 1 under drawing conditions shown in the Table 1.

Figure 15:
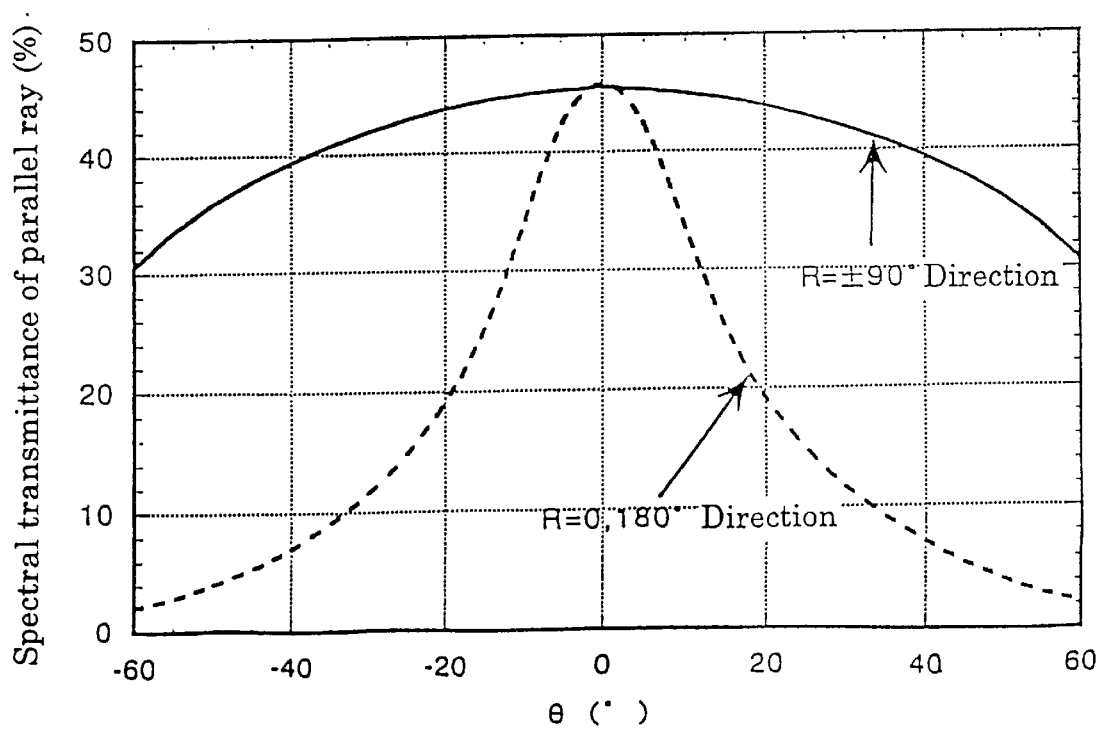
FIG. 15 is an incident angle dependence of the parallel ray transmittance of the film of the Example 6 of the present invention.

The optical characteristics of the obtained film 6 are shown in the Table 1. The FIG. 15 shows the R and θ dependency of the parallel lay transmittance of the film measured by the optical system of the FIG. 4 similar to the Example 1.

The presence of a number of micro voids was confirmed, similar to the Example 1, by the scanning electron microscope observation of a cross-section formed by slicing the film 6 perpendicular to the film surface and parallel to the drawing direction.

An arbitrary area of 20 μm square on the surface of the film was observed by an atomic force microscope similar to the Example 1. Grooves perpendicular to the drawing direction of the film were observable from the microscope image. The observed groove had a length of 15 μm, the widths of 9 μm, 9 μm and 10 μm at both ends and middle part, respectively, and depths of 50 nm, 50 nm and 70 nm at both ends and middle part, respectively. The longitudinal direction of the groove was nearly perpendicular to the drawing direction. The presence of similar grooves was observable on the reverse face of the film.

The film 6 was observed by an optical microscope with a magnification of ×400. A number of microscopic optical dark areas extending nearly perpendicular to the drawing axis corresponding to the slow optic axis were observed.

The thermal durability test of the film 6 was performed similar to the Example 1 and there was little change in the characteristics after the test.

Figure 16:
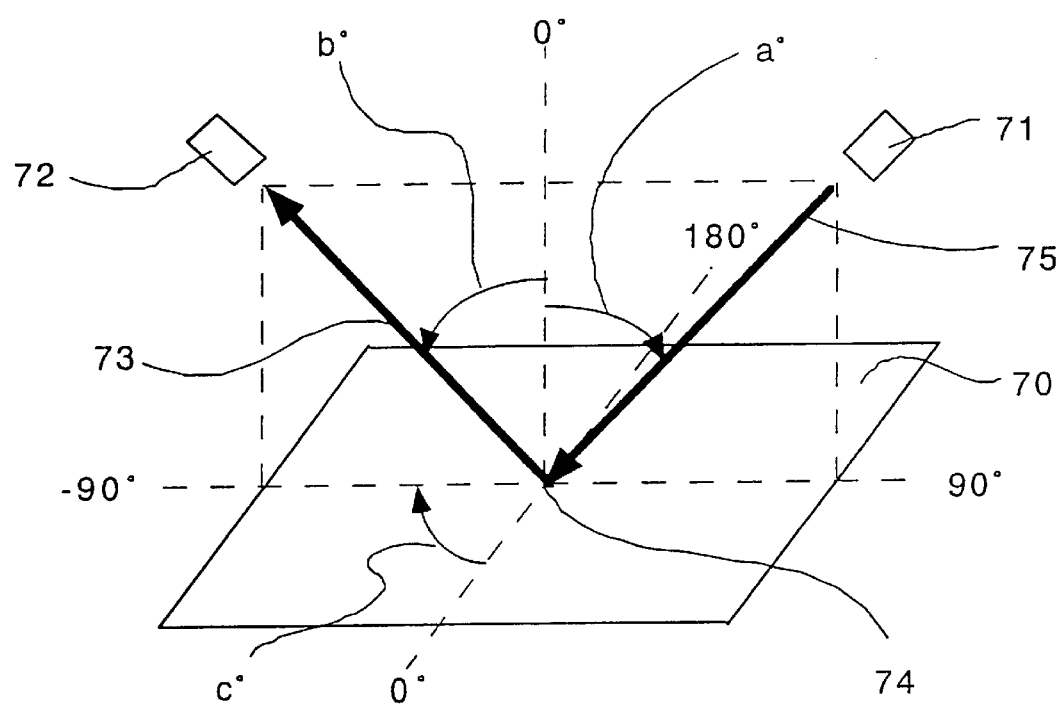
FIG. 16 is a schematic drawing of the optical system for the measurement of an incident angle dependence of the relative reflectance of a reflection film.
Figure 17:
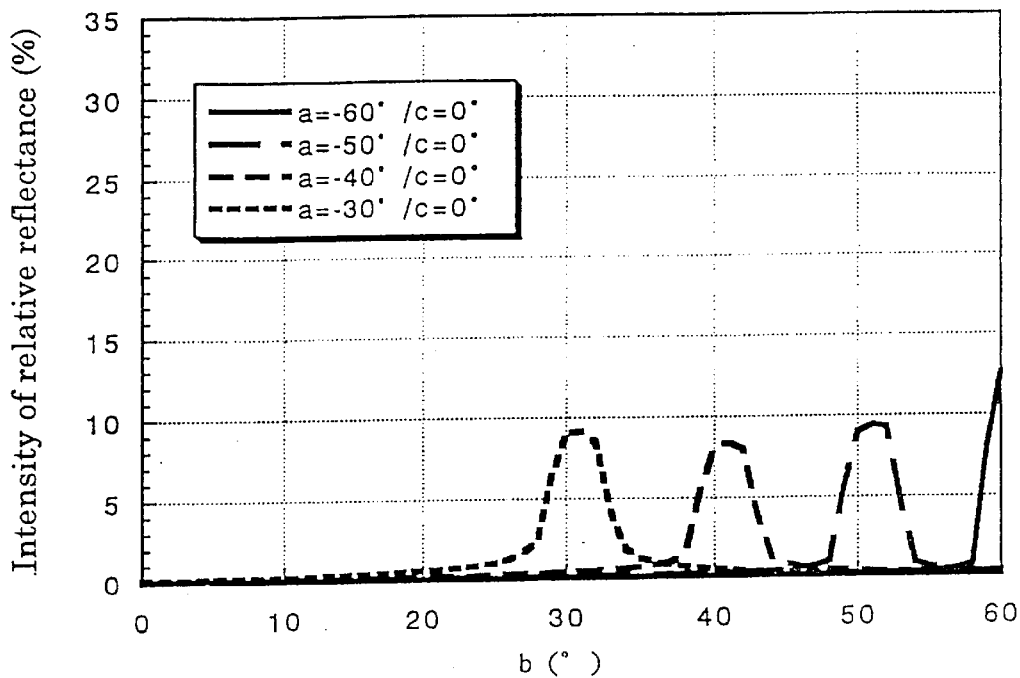
FIG. 17 is an incident angle dependence of the relative reflectance of the reflection film of the Example 6 (c=0°).
Figure 18:
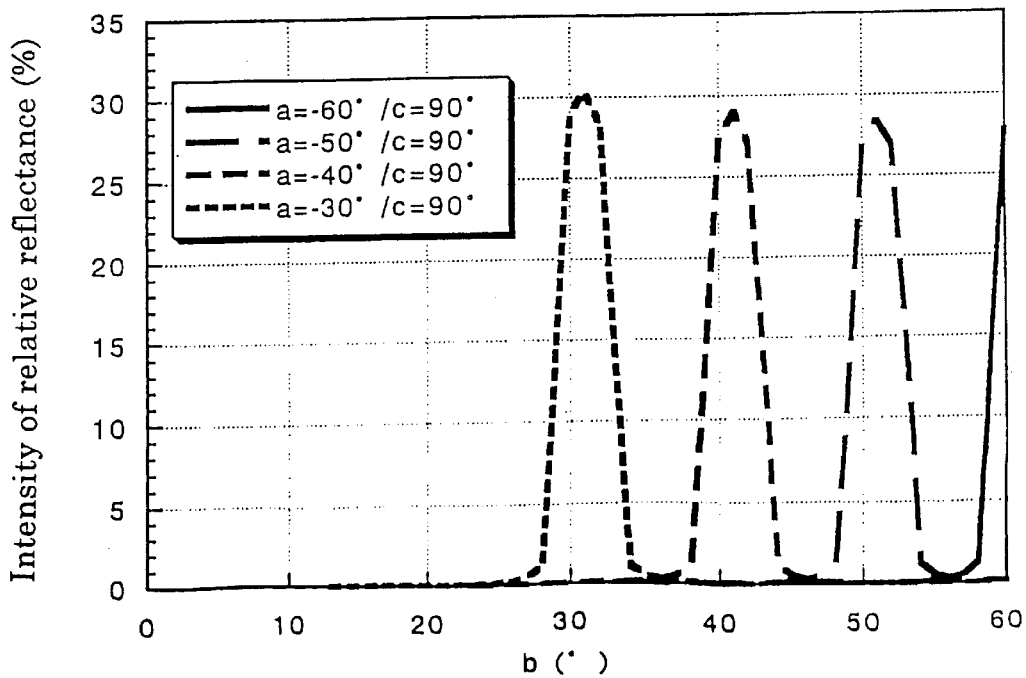
FIG. 18 is an incident angle dependence of the relative reflectance of the reflection film of the Example 6 (c=90°).

A metallic film similar to the reference was applied to one surface of the film 6 by sputtering to obtain the objective reflection film (a laminate of film 6/stainless steel/ aluminum). The incident angle dependencies of the relative reflectivity of the film measured by the optical system shown in the FIG. 16 are shown by the FIGS. 17 and 18. The light is applied to the side of the polycarbonate (the side of the film 6). The drawing direction of the film 6 of the present invention was taken as c=0 and 180°. In the FIGS. 17 and 18, the normal line direction of the film was taken as 0° and the incident angle (a°) and the reflection angle (b°) were expressed by a negative value and a positive value, respectively. The FIG. 17 shows the results of the case wherein the intersection between the reflecting film and a plane formed by the light source, the measuring point and the detector and perpendicular to the reflection film is parallel to the direction of c=0 and 180° and the FIG. 18 corresponds to the case wherein said intersection is parallel to the direction of c=–±90°. It is obvious from the FIGS. 17 and 18 that the relative reflectance is remarkably dependent upon the incident angle (c°). The FIGS. 17 and 18 show only the cases of c=0° and 90°, respectively, however, the results of c=180° and c=–90° are same as those of c=0° and c=90°, respectively.

The reflection film was used as a back reflection film of a pocketable computer having a reflection-type liquid crystal display device and manufactured by Sharp Corp. (commercial name: Zaurus PI-6000) and the screen was observed in a room lighted with a fluorescent lamp. There was no obstructive reflection of the back scene outside of the liquid crystal display device by the reflection film even by observing the display from the direction of the normal line (front side of the screen). Further, it has been found that a reflection-type liquid crystal display device having controllable brightness dependent on the viewing angle according to the use can be produced by properly adjusting the pasting angle of the reflection film.

EXAMPLE 7

The objective film 7 was produced by the longitudinal uniaxial drawing of the transparent undrawn film used in the Example 6 by the drawing machine used in the Example 1 under the drawing conditions shown in the Table 1.

Figure 19:
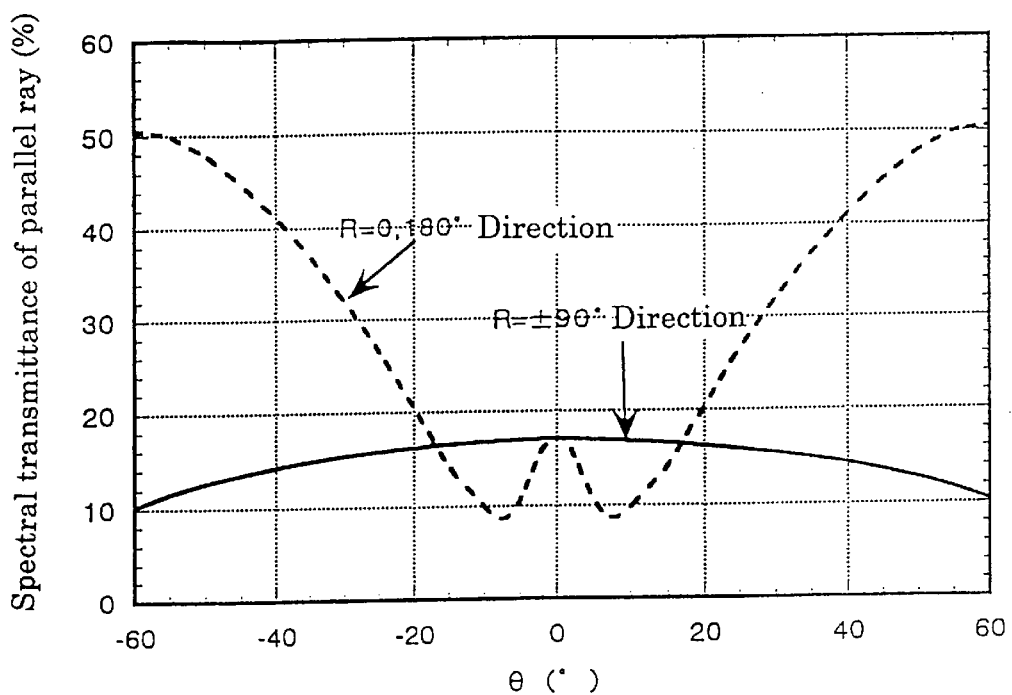
FIG. 19 is an incident angle dependence of the parallel ray transmittance of the film of the Example 7 of the present invention.

The optical characteristics of the obtained film 7 are shown in the Table 1. The FIG. 19 shows the R and θ dependency of the parallel ray transmittance of the film measured by the optical system of the FIG. 4 similar to the Example 1.

Figure 20:
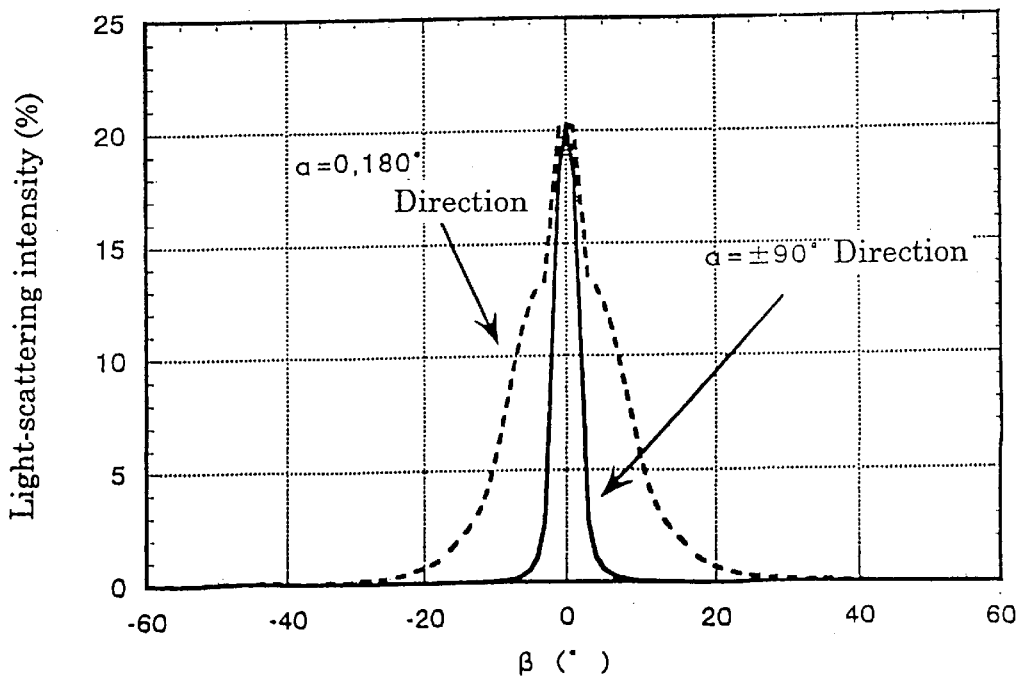
FIG. 20 is an incident angle dependence of the light-scattering intensity of the film of the Example 7 of the present invention.

Intensity distribution of scattered light was measured by applying a parallel ray from the normal line direction of the film using the optical system of the FIG. 5 at a rotational angle of α=0, 90, –90 and 180° around the entering direction of the parallel ray and changing the angle β(°) between the outgoing scattered light and the normal line from 0° to 60°. The results are shown in the FIG. 20. The drawing direction of the film corresponds to α=0 and 180°. It has been found from the FIG. 20 that the scattered light intensity is nearly 0% e.g. at α=90° when β=10°, however, the intensity of scattered light is 7% at α=0° revealing the angle dependency of the light-scattering direction. In the FIG. 20, the value of β is expressed by a positive value at α=0 and 90° and a negative value at α=–90 and 180°.

The film 7 was pasted to a glass window in a room with a tacky adhesive. Although the outdoor light was strongly scattered in the directions of α=0 and 180°, the scatter of light became extremely weak at α=±90° showing that the lighting of a room with outdoor light was controllable taking advantage of the unique scattered intensity distribution of the film of the present invention.

The presence of a number of micro voids was confirmed, similar to the Example 1, by the scanning electron microscope observation of a cross-section formed by slicing the film 7 perpendicular to the film surface and parallel to the drawing direction.

An arbitrary area of 20 μm square on the surface of the film was observed by an atomic force microscope similar to the Example 1. Grooves perpendicular to the drawing direction of the film were observable from the microscope image. The observed groove had a length of 20 μm, widths of 4 μm, 4 μm and 6 μm at both ends and middle part, respectively, and depths of 40 nm, 30 nm and 40 nm at both ends and middle part, respectively. The longitudinal direction of the groove was nearly perpendicular to the drawing direction. The presence of similar grooves was observed on the reverse face of the film.

The film 7 was observed by an optical microscope with a magnification of ×400. A number of microscopic optical dark areas extending nearly perpendicular to the drawing axis corresponding to the slow optic axis were observed as dark areas having relatively low transmitted light intensity.

The thermal durability test of the film 7 was performed similar to the Example 1 and there was little change in the characteristics after the test.

The film was used as a front scattering film of a mobile computer having a reflective liquid crystal display device and manufactured by Sharp Corp. (commercial name: Zaurus PI-6000) by pasting the film 7 to the polarizing plate of the observer's side with a tacky adhesive. A film having an antiglare layer was used as the film 7. The antiglare layer was formed by the following manner. A solution produced by mixing 100 parts by weight of a trimethylolpropane ethylene oxide-modified acrylate (Aronix M-350, product of Toa Gosei Kagaku Co.), 7 parts by weight of 1-hydroxycyclohexyl phenyl ketone (Irgacure 184, product of Ciba-Geigy Co.) as a photopolymerization initiator, 0.1 part by weight of fine silicone resin particles having an average particle diameter of 4.5 µm (Tospearl 145, product of Toshiba-Silicone Co.) and 200 parts by weight of 1-methoxy-2-propanol was applied to the film by roll-coating, dried at 60° C. for 1 minute and irradiated with a high-pressure mercury lamp of 120 mW/cm$^2$ to a cumulative light quantity of about 800 mJ/cm$^2$ to obtain an antiglare layer having a thickness of about 3.5 µm.

Figure 21:
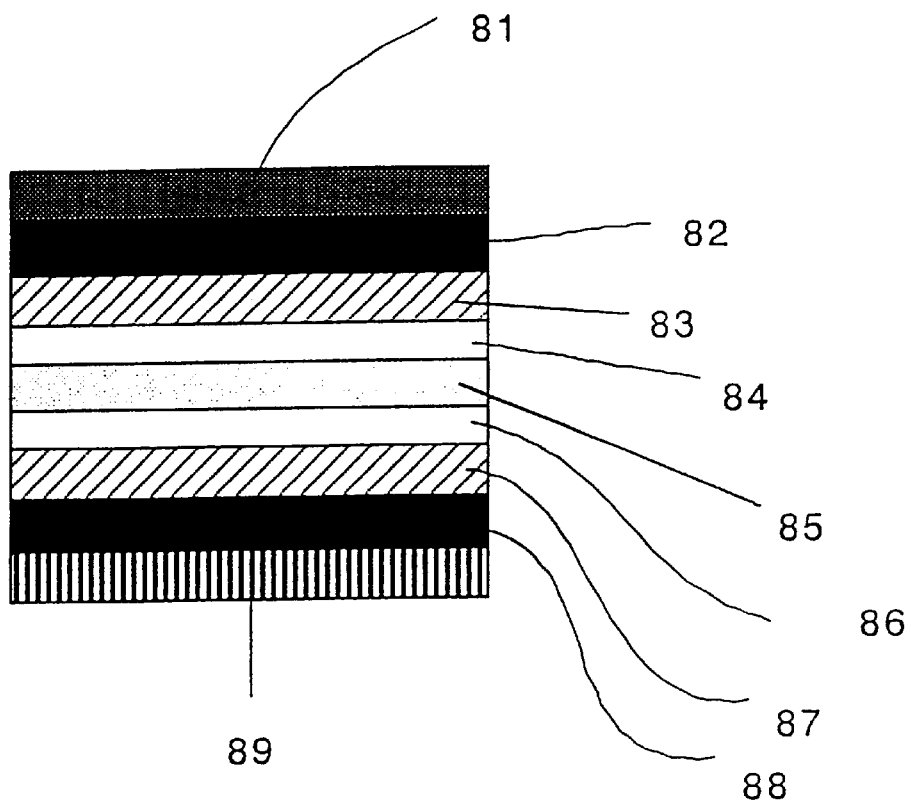
FIG. 21 is a schematic drawing of the reflective liquid crystal display device of the Example 7.

Only the reflection film was peeled off from the back of the above reflective liquid crystal display device, and a reflection film of the Example 6 having a metallic film was pasted to the polarizing plate. The reflection film was produced by laminating a metallic film on a polycarbonate film produced by a cast film-forming process and having a total light transmittance of 91% and a haze of 0.3% measured with light entering to the film from the normal line direction of the film surface. The obtained reflective liquid crystal display device has a construction similar to the one shown in the FIG. 21. In the FIG. 21, the sign 81 is the film 7 of the present invention, 82 is a polarizing plate, 83 is a glass or plastic substrate, 84 is a transparent electrode, 85 is a liquid crystal layer, 86 is a transparent electrode, 87 is a glass or plastic substrate, 88 is a polarizing plate and 89 is a reflection plate.

The screen was observed in a room lighted with a fluorescent lamp. There was no obstructive reflection of the back scene outside of the liquid crystal display device by the reflection film even by observing the display from the direction of the normal line of the screen. Further, it has been found that a reflective liquid crystal display device having controllable brightness dependent on the viewing angle according to the use can be produced by properly adjusting the pasting angle of the front scattering film (the film 7).

EXAMPLE 8

A lens sheet (product of Dai Nippon Printing Co., commercial name: V7) composed of small prisms extending in one direction was placed on the back-light system used in the Example 1, and the film 6 of the present invention similar to the film prepared by the Example 6 was placed on the lens sheet. The longitudinal direction of the prism of the lens sheet was placed parallel to the horizontal direction of the panel, and the drawing axis of the film was directed perpendicular to the longitudinal direction of the prism. The frontal light intensity of the sheet produced by placing the film 6 on the lens sheet was measured by a liquid crystal display device evaluation apparatus of Otsuka Denshi Co. (LCD5100) and the intensity was 92% based on the 100% light intensity of the screen free from the film. The angle dependency of the intensity was determined by measuring the change of the intensity in vertical and horizontal directions. The term ο is an angle between the normal line of the panel and a line connecting the light-quantity detector and the measuring point on the back light system. The normal line was taken as φ=0°. In a construction formed by simply placing the lens sheet on the back light, the intensity decreased according to the increase in the angle φ from φ=0 to 60° in vertical direction, however, the intensity was remarkably increased again at φ=70 to 90° or thereabout to cause the deterioration of the displaying quality. On the other hand, in the case of a system produced by placing the film 6 on the lens sheet, the intensity decreased according to the increase in φ in vertical direction and there was no increase in the intensity even at φ=70 to 90° or thereabout.

Figure 22:
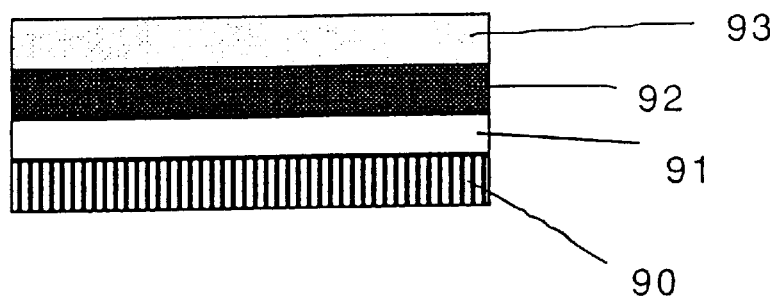
FIG. 22 is a schematic drawing of the liquid crystal display device manufactured in the Example 8.

A liquid crystal display driving part of a note-size personal computer manufactured by Nippon Electric Co. (PC-9801 NS/E) was placed on the back light system containing the film 6. The constitution is shown by the FIG. 22. The obtained liquid crystal display device had high displaying quality having improved frontal intensity and free from increase in the intensity even at φ=70 to 90° or thereabout in the vertical direction of the panel. In the FIG. 22, the sign 90 is a commercially available back light system, 91 is a commercially available lens sheet, 92 is the film 6 of the present invention and 93 is a commercially available liquid crystal display driving part.

EXAMPLE 9

Figure 23:
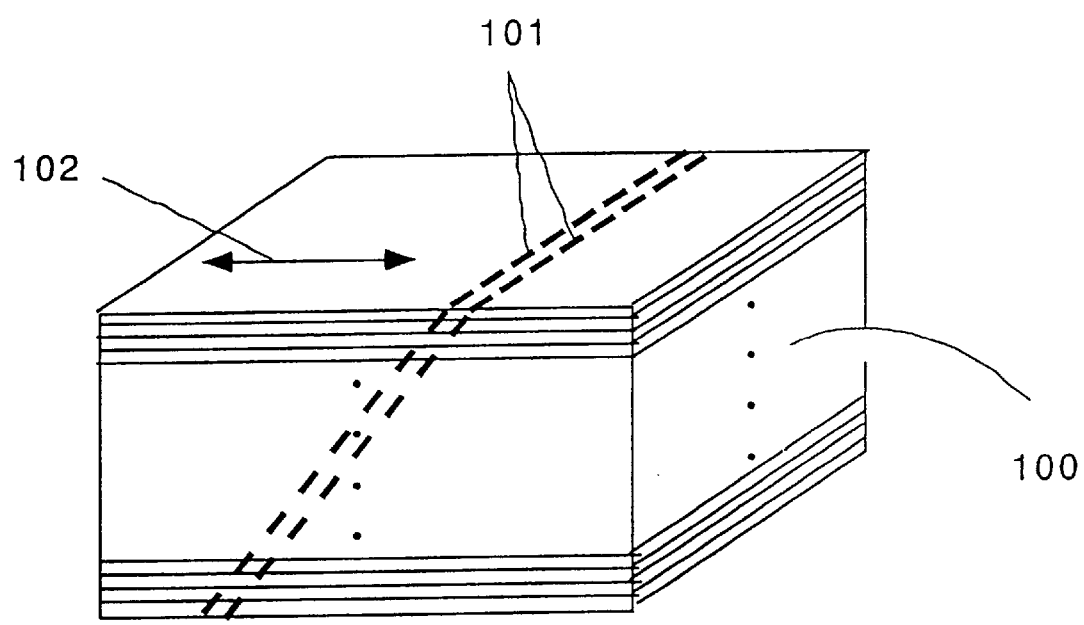
FIG. 23 is a schematic drawing of a multi-layer film of the Example 9.

The film 7 of the present invention produced in the Example 7 was cut to 10 cm square, and 1,000 pieces of the films were pasted one upon another keeping the same drawing directions using an acrylic tacky adhesive agent (about 10 µm thick) having a refractive index adjusted to the value nearly equal to that of a polycarbonate. The thickness of the produced multilayer film A was about 50 mm. The film A was sliced with a cutter in a manner shown in the FIG. 23 keeping the blade perpendicular to the drawing direction at an angle of 60° taking the normal line direction as 0°. In the FIG. 23, the sign 100 is the multilayer film A, 101 is the sliced section and 102 is the drawing direction. The R and θ dependencies of the parallel light transmittance of the obtained multilayer film B were measured by the optical system of the FIG. 4 similar to the Example 1 and the results are shown by the FIG. 24. In the FIG. 24, the transmittance at R=0° and θ=−15° was set to 100%.

EXAMPLE 10

A transparent undrawn film having a width of 23 cm and a thickness of 75 µm and exhibiting the characteristics shown in the Table 1 was produced by a method similar to the Example 1.

The objective film 10 was produced by the longitudinal uniaxial drawing of the obtained transparent undrawn film with a drawing machine used in the Example 1 under drawing conditions shown in the Table 1.

The optical characteristics of the obtained film 10 are shown in the Table 1.

The presence of a number of small voids was confirmed, similar to the Example 1, by the scanning electron microscope observation of a cross-section formed by slicing the film of the present invention perpendicular to the film surface and parallel to the drawing direction.

An arbitrary area of 20 µm square on the surface of the film was observed by an atomic force microscope similar to the Example 1. Grooves having a length/width ratio (a/b) of 1.5 or above were observable. The presence of similar grooves was confirmed on the reverse face of the film.

The film 10 was observed by an optical microscope with a magnification of ×400. A number of microscopic optical dark areas extending nearly perpendicular to the drawing axis corresponding to the slow optic axis were observed.

The film 10 was pasted on a transparent acrylic resin plate of 4 mm thick with a tacky adhesive, and the scene was observed through the glass. The glass was cloudy and the scene was not clearly observable when viewed in the direction of the normal line, however, the transparency of the glass was gradually increased according to the angle when viewed slantly to the drawing direction to give clearer view of the scene.

EXAMPLE 11

A photoset resin film having a blaze-like form was formed on one surface of the film 1 of the present invention produced in the Example 1. The photoset film was formed by the following method. A blaze-formed mold having a blaze angle of 20° and a blaze pitch of 30 µm was manufactured.

Figure 27:
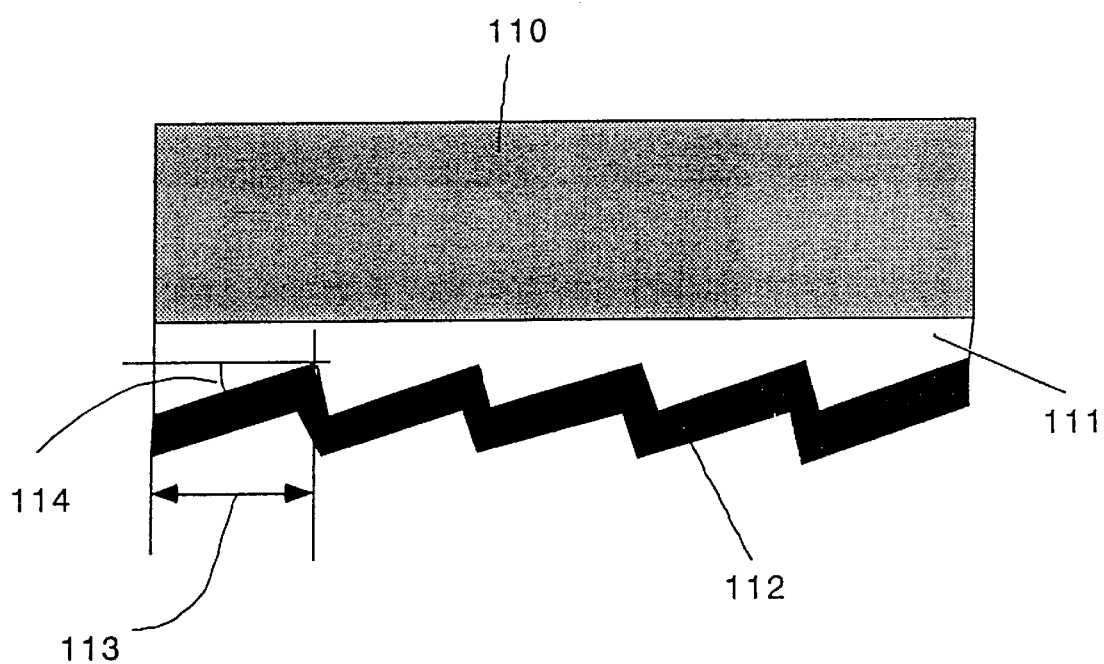
FIG. 27 is a schematic drawing of the cross-section of the reflection film of the Example 11.

A polyester acrylate monomer (M309, product of Toa Gosei Co.) containing 3% by weight of a photopolymerization initiator (Irgacure 184, product of Ciba Geigy Co.) was placed between the mold and the film 1 and the mold was removed after curing the monomer with ultraviolet rays to form a photoset resin film on one surface of the film 1. A metallic film similar to the reference was formed on the blaze-formed surface to obtain the objective reflection film. The schematic drawing of the cross-section of the film is shown in the FIG. 27. In the Figure, the sign 110 is the oriented film of the present invention, 111 is a blaze-formed photoset resin film, 112 is a metallic film, 113 is a blaze pitch and 114 is an inclination angle of the blaze.

The reflection film was used as a back reflection film of a mobile computer having a reflective liquid crystal display device and manufactured by Sharp Corp. (commercial name: Zaurus PI-6000) and pasted with a tacky adhesive, and the screen was observed in a room lighted with a fluorescent lamp. There was no obstructive reflection of the back scene outside of the liquid crystal display device by the reflection film even by observing the display from the direction of the normal line (front side of the screen) to confirm the improvement in the visibility.

COMPARATIVE EXAMPLE 1

The transparent undrawn film used in the Example 1 was subjected to longitudinal uniaxial drawing with a drawing machine used in the Example 1 under drawing conditions shown in the Table 1.

The optical characteristics of the drawn film produced by this process are shown in the Table 1. The film was transparent independent of the viewing angle to fail in getting the objective film.

An arbitrary area of 20 $\mu$m square on the surface of the film was observed by an atomic force microscope, and there was no groove formed by drawing.

The film was sliced perpendicular to the film surface and parallel to the drawing direction, and the cross-section was observed by a scanning electron microscope at a magnification of 2,000. There was no observable void in contrast with the film of the Example 1, etc.

COMPARATIVE EXAMPLE 2

A homogeneous solution was prepared by adding 0.125 part by weight of 2,6-di-t-butyl-p-cresol, 0.25 part by weight of tetrakis[methylene-3-(3,5-di-t-butyl-4-hydroxyphenyl)-propionate]methane and an antioxidant to 100 parts by weight of a liquid paraffin mixture containing 4.0% by weight of a polyethylene having a weight-average molecular weight of 2,000,000, charging the obtained liquid mixture into an autoclave furnished with a stirrer, heating at 200° C. and stirring for 90 minutes. The solution was filled in a hot mold and quenched to 10° C. to obtain a gelatinous sheet having a thickness of 5 mm. The gelatinous sheet was immersed in 250 ml of methylene chloride for 50 minutes. A stock sheet having a liquid paraffin content of 63% by weight was produced by evaporating methylene chloride to dryness from the gelatinous sheet in a state pasted on a smooth glass substrate. The obtained stock sheet (10×10 cm) was set on a biaxial drawing machine provided with chucks and subjected to simultaneous biaxial drawing at 130° C., a drawing speed of 10 cm/min and a draw ratio of 5 for each direction. The obtained drawn film was washed with methylene chloride to extract and remove the residual liquid paraffin and dried to obtain a film composed of the polyethylene. The film was white and opaque.

The optical characteristics of the film are shown in the Table 1.

The film was sliced perpendicular to the film surface and parallel to the drawing direction, and the cross-section was observed c by a scanning electron microscope. The cross-section had a structure having a number of voids.

An arbitrary area of 20 $\mu$m square on the surface of the film was observed by an atomic force microscope, and there was no groove formed by drawing.

The haze and the total light transmittance of the film were 91.9% and 28.8%, respectively. The angle dependency of the parallel light transmittance was measured and there was no change in the scattering property of the transmitted light dependent upon the angle.

COMPARATIVE EXAMPLE 3

Figure 25:
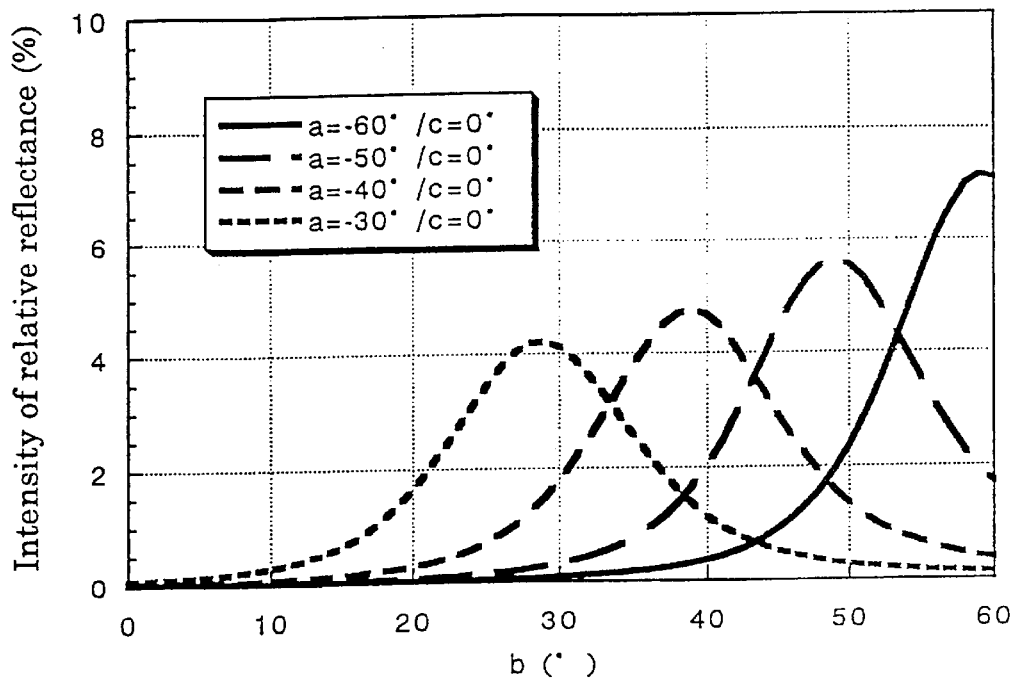
FIG. 25 is an incident angle dependence of the relative reflectance of the reflection film of the Comparative Example 3 (c=0°).
Figure 26:
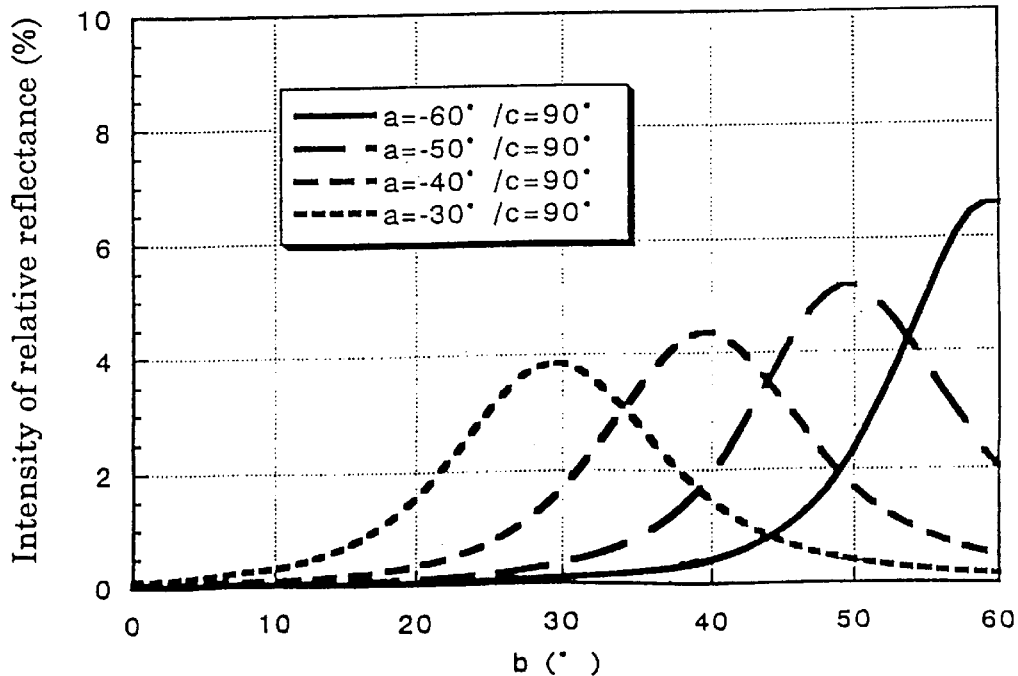
FIG. 26 is an incident angle dependence of the relative reflectance of the reflection film of the Comparative Example 3 (c=90°).

The relative reflectance of the reflection film used in a mobile computer (product of Sharp Corp.: Zaurus PI-6000) provided with a reflective liquid crystal display device was measured in a manner similar to the Example 6. The vertical direction of the screen was defined as c=0 and 180°. It is clear from the FIGS. 25 and 26 that there is no considerable change in the relative reflectance with the incident direction (c°). The screen exhibited little variation of luminance with the viewing angle.

COMPARATIVE EXAMPLE 4

A light-diffusion film (product of Tsujimoto Denki Co.: D113T) was used in place of the film of the present invention of the Example 8. The film had a haze value of 90.2% and a total light transmittance of 63.8%. The frontal light intensity of a laminate produced by placing the light-scattering film on the lens sheet was measured by a liquid crystal display device evaluation apparatus of Otsuka Denshi Co. (LCD5100) and the intensity was 80% when the light intensity free from the light-scattering film was taken as 100%.

TABLE 1

| | | Example 1 | Example 2 | Example 3 | Example 4 | Example 5 | Example 6 | Example 7 | Example 10 | Comparative Ex. 1 | Comparative Ex. 2 |
|---|---|---|---|---|---|---|---|---|---|---|---|
| Characteristics of undrawn film | Thermoplastic polymer 1) | PC | PC | PC | PC | PEN | PC | PC | PC | PC | PE |
| | Org. solvent content 2) | 0.1 wt % M | none | 4 wt. % M | 4 wt. % M | none | 4 wt. % M | 4 wt. % M | 8 wt. % M | 0.1 wt. % M | 63 wt. % P |
| | Total light transmit. (%) | 91.0 | 91.0 | 91.0 | 91.0 | 89.0 | 91.0 | 91.0 | 91.0 | 91.0 | — |
| | Haze (%) | 0.3 | 0.3 | 0.3 | 0.4 | 0.7 | 0.3 | 0.3 | 0.3 | 0.3 | — |
| | Δ n · d (nm) | 10 | 15 | 5 | 5 | 20 | 10 | 10 | 10 | 10 | — |
| | Film thickness ($\mu$m) | 75 | 125 | 75 | 75 | 90 | 75 | 75 | 100 | 75 | — |
| Drawing Condition | 1st Stage Draw Ratio | 2.7 | 1.7 | 2.1 | 2.1 | 5.3 | 2.1 | 2.4 | 2.7 | 1.1 | 5 |

TABLE 1-continued

|  |  | Example 1 | Example 2 | Example 3 | Example 4 | Example 5 | Example 6 | Example 7 | Example 10 | Comparative Ex. 1 | Comparative Ex. 2 |
|---|---|---|---|---|---|---|---|---|---|---|---|
|  | 1st Stage Draw Temp (° C.) | 153 | 145 | 104 | 102 | 70 | 103 | 103 | 62 | 157 | 130 |
|  | 2nd Stage Draw Ratio | — | 1.6 | — | — | — | — | — | — | — | — |
|  | 2nd Stage Draw Temp (° C.) | — | 143 | — | — | — | — | — | — | — | — |
| Characteristics of Drawn Film | T500 (%) | 30.3 | 30.4 | 42.9 | 50.1 | 15.6 | 55.3 | 25.2 | 19.4 | 89.9 | 0.1 |
|  | T1500 (%) | 78.2 | 78.0 | 46.7 | 54.1 | 86.4 | 53.1 | 76.1 | 81.6 | 92.8 | 0.3 |
|  | T1500/T500 | 2.58 | 2.57 | 1.09 | 1.08 | 5.54 | 0.96 | 3.02 | 4.21 | 1.03 | 3 |
|  | Total light transmit. (%) | 90.5 | 89.9 | 88.7 | 89.7 | 71.6 | 90.0 | 89.9 | 90.4 | 91.0 | 28.8 |
|  | Haze (%) | 54.6 | 56.9 | 49.0 | 40.7 | 59.0 | 40.2 | 62.7 | 69.6 | 0.3 | 91.9 |
|  | Δn·d (nm) | 2300 | 3700 | 1600 | 1700 | >3000 | 1600 | 1900 | 2600 | 400 | — |
|  | Film thickness (μm) | 38.2 | 66.1 | 40.2 | 40.7 | 41 | 41.0 | 40.0 | 40 | 69.5 | — |
|  | T min (%) | 15.9 | 10.8 | 0.8 | 1.0 | 13.1 | 2.3 | 8.6 | 8.7 | 82.2 | — |
|  | θ min (°) | 22 | 7 | 60 | 60 | 5 | 60 | 7 | 10 | 60 | — |
|  | T max (%) | 44.6 | 40.7 | 36.2 | 43.7 | 30.0 | 46.1 | 50.7 | 57.3 | 89.5 | — |
|  | θ max (°) | 60 | 60 | 0 | 0 | 30 | 0 | 60 | 60 | 0 | — |

1) PC: Polycarbonate, PEN: Polyethylene Naphthalate, PE: Polyethylene
2) M: Methylene Chloride, P: Liquid Paraffin

INDUSTRIAL APPLICABILITY

The micro void-containing oriented film of the present invention varying its light scattering property dependent upon the angle has a function to scatter the light entered into the film at a specific angle. The film can be used as a viewing angle improvement film e.g. by placing in front of a liquid crystal display device taking advantage of the property. A reflective liquid crystal display device having excellent viewing angle can be produced by laminating a metallic film to the film of the present invention and using the laminate as a reflection film.

A glass plate having controllable viewing angle can be produced by pasting the oriented film of the present invention to a glass plate.

What is claimed is:

1. A micro void-containing oriented film comprising a thermoplastic polymer, containing a number of micro voids in the film and varying a scattering property of a transmitted light depending upon an angle, and having a total light transmittance of at least 80%.

2. A micro void-containing oriented film according to claim 1 characterized in that the film contains microscopic optical dark areas nearly uniformly distributed in a plane parallel to the film surface, extended perpendicular to the orientation direction of the film and having a width of from 0.05 to 40 μm.

3. A micro void-containing oriented film according to claim 1 characterized in that the film has a rotational angle R (°) satisfying the following formula (I) or (II) in the range of $0° \leq \theta \leq 60°$ and $-180° < R \leq 180°$, $$\text{Tmax/Tmin} > 1.5 \text{ when } \theta \text{ min} < \theta \text{ max} \quad (I)$$

$$\{\text{Tmax} \times \cos(\theta \text{ min})\}/\{\text{Tmin} \times \cos(\theta \text{ max})\} > 1.5 \text{ when } \theta \text{ min} > \theta \text{ max} \quad (II)$$

wherein θ(°) is an angle between an incident direction of light and a normal line of the film surface, R (°) is a rotational angle on the film surface around the normal line of the film, Tmin (%) is a minimum parallel ray transmittance, θ min(°) is an incident angle corresponding to the above, Tmax (%) is a maximum parallel, ray transmittance and θ max(°) is an incident angle corresponding to the above.

4. A micro void-containing oriented film according to claim 1 characterized im that the film satisfies, in a plane parallel to the orientation direction of the film and perpendicular to the film, the following formula (I) or (II) in the range of $0° \leq \theta \leq 60°$, $$\text{Tmax/Tmin} > 1.5 \text{ when } \theta \text{ min} < \theta \text{ max} \quad (I)$$

$$\{\text{Tmax} \times \cos(\theta \text{ min})\}/\{\text{Tmin} \times \cos(\theta \text{ max})\} > 1.5 \text{ when } \theta \text{ min} > \theta \text{ max} \quad (II)$$

wherein θ (°) is an angle between an incident direction of light and the normal line of the film surface, Tmin (%) is an minimum parallel light transmittance, θ min (°) is an incident angle corresponding to the above, Tmax (%) is the maximum parallel light transmittance and θ max (°) is an incident angle corresponding to the above.

5. A micro void-containing oriented film according to claim 1 characterized in that the film has a retardation of 50 nm or above at 590 nm wavelength.

6. A micro void-containing oriented film according to claim 1 characterized in that the film satisfies the following formulas (III) and (IV)

$$0.5 \leq \text{T1500/T500} \leq 30 \quad (III)$$

$$3\% \leq \text{T500}(\%) \leq 85\% \quad (IV)$$

wherein T500(%) and T1500(%) are parallel ray transmittance values of the film measured at a wavelength of 500 nm and 1,500 nm, respectively.

7. A micro void-containing oriented film according to claim 1 wherein the thermoplastic polymer is a polycarbonate.

8. A micro void-containing oriented film according to claim 1 characterized in that the film is laminated with a glass substrate.

9. A micro void-containing oriented film according to claim 1 characterized in that the film is laminated with a layer comprising of a transparent polymer.

10. A micro void-containing oriented film according to claim 1 characterized in that a layer comprising a metal is laminated on the film.

11. A micro void-containing oriented film according to claim 1 characterized in that a reflection film is laminated on the film.

12. A micro void-containing oriented film according to claim 1 characterized in that a polarizing film and an optical compensation film are laminated on the film.

13. A micro void-containing oriented film varying transmitted light scattering property dependent upon an angle, which is and produced by uniaxially drawing a film comprising a thermoplastic polymer in such a manner as to form grooves on the film surface perpendicular to the drawing direction, and said film having a total light transmittance of at least 80%.

14. A process for producing a micro void-containing oriented film with varying transmitted light scattering property dependent upon an angle, which comprises uniaxially drawing a film comprising a thermoplastic polymer in such a manner as to form grooves on the film surface perpendicular to the drawing direction, and said film having a total light transmittance of at least 80%.

15. A process according to claim 14 for the production of a micro void-containing oriented film provided that the uniaxial drawing is performed within a temperature range of from Tg'−50(° C.) to Tg' (Tg' is a glass transition temperature of the film comprising a thermoplastic polymer) and a neck-in ratio range of from 25 to 70%.

16. A process according to claim 14 for the production of a micro void-containing oriented film provided that the film comprising of a thermoplastic polymer is produced by a cast film-forming process and contains not more than 15% by weight of a solvent used in the cast film-forming process.

17. A process according to claim 14 for the production of a micro void-containing oriented film wherein the thermoplastic polymer is a polycarbonate.

18. A process for the production of a micro void-containing oriented film comprising: forming a film comprising a thermoplastic polymer and drawing the film uniaxially, wherein said film containing a number of micro voids in the film and varying a scattering property of a transmitted light depending upon an angle, and having a total light transmittance of at least 80%.

19. A light-scattering control film comprising the micro void-containing oriented film according to claim 1.

20. A reflection film comprising the micro void-containing oriented film according to claim 1 and a metallic film.

21. A reflection film according to claim 20, wherein the metallic film has a blaze-shaped structure.

22. A laminated film comprising a micro void-containing oriented film according to claim 1 and a polarizing film.

23. A laminated film comprising a micro void-containing oriented film according to claim 1, a polarizing film and an optical compensation film.

24. A liquid crystal display device having a micro void-containing oriented film according to claim 1 at a side of an observer relative to a liquid crystal layer of the liquid crystal display device.

25. A liquid crystal display device comprising a micro void-containing oriented film comprising a thermoplastic polymer at the side of an observer relative to a polarizing film arranged at the side of an observer relative to a liquid crystal layer of the liquid crystal display device, containing a number of micro voids in the film, varying a transmitted light scattering property depending upon an angle, and having a rotational angle R(°) satisfying the following formula (I) or (II) in the range of $0° \leq \theta \leq 60°$ and $-180° < R \leq 180°$, $$\text{Tmax/Tmin} > 1.5 \text{ when } \theta \min < \theta \max \qquad (I)$$

$$\{\text{Tmax} \times \cos(\theta \min)\}/\{\text{Tmin} \times \cos(\theta \max)\} > 1.5 \text{ when } \theta \min > \theta \max \qquad (II)$$

wherein $\theta(°)$ is an angle between an incident direction of light and the normal line of the film surface, R (°) is a rotational angle on the film surface around the normal line, Tmin (%) is a minimum parallel lay transmittance, $\theta$ min (°) is an incident angle corresponding to the above, Tmax (%) is a maximum parallel lay transmittance and $\theta$ max (°) is an incident angle corresponding to the above.

26. A reflective liquid crystal display device comprising the micro void-containing oriented film according to claim 1.

27. A liquid crystal display device provided with the micro void-containing oriented film according to claim 1 as a light-scattering film in a back-light system of the liquid crystal display device.

28. A micro void-containing oriented film according to claim 1 used in a liquid crystal display device.

29. A micro void-containing oriented film according to claim 1 used as a viewing angle improvement film.

30. A micro void-containing oriented film according to claim 1, wherein said film is an achromatic film.

* * * * *